United States Patent
Arditi et al.

(10) Patent No.: US 7,912,259 B2
(45) Date of Patent: Mar. 22, 2011

(54) IMAGE REGISTRATION METHOD AND APPARATUS FOR MEDICAL IMAGING BASED ON MULTIPLE MASKS

(75) Inventors: Marcel Arditi, Genève (CH); Nicolas Rognin, Genève (CH); Tristan Messager, Genève (CH); Jean-Philippe Thiran, St-Légier (CH); Ruth Campos, Chavannes-pres-Renens (CH)

(73) Assignee: Bracco International BV, Amsterdam (NL)

( * ) Notice: Subject to any disclaimer, the term of this patent is extended or adjusted under 35 U.S.C. 154(b) by 1077 days.

(21) Appl. No.: 11/659,887

(22) PCT Filed: Aug. 5, 2005

(86) PCT No.: PCT/EP2005/053871
§ 371 (c)(1),
(2), (4) Date: Feb. 9, 2007

(87) PCT Pub. No.: WO2006/015971
PCT Pub. Date: Feb. 16, 2006

(65) Prior Publication Data
US 2008/0049994 A1     Feb. 28, 2008

(30) Foreign Application Priority Data
Aug. 9, 2004 (EP) .................. 04103825

(51) Int. Cl.
*G06K 9/00* (2006.01)
(52) U.S. Cl. ......................................... 382/128
(58) Field of Classification Search ............ 382/128
See application file for complete search history.

(56) References Cited

U.S. PATENT DOCUMENTS
6,352,511 B1     3/2002  Seyed-Bolorforosh et al.
6,496,560 B1    12/2002  Chandra et al.
6,718,055 B1 *   4/2004  Suri .......................... 382/128
(Continued)

FOREIGN PATENT DOCUMENTS
EP       0 362 849 A     4/1990
(Continued)

OTHER PUBLICATIONS
International Search Report for PCT/EP2005/053871 dated Dec. 5, 2005.
(Continued)

*Primary Examiner* — Bhavesh M Mehta
*Assistant Examiner* — Hadi Akhavannik
(74) *Attorney, Agent, or Firm* — Bryan A. Santarelli; Graybeal Jackson LLP

(57) ABSTRACT

An image registration method for use in medical imaging includes the steps of: providing a sequence of images each one including a digital representation of a body-part under analysis, selecting a reference image within the sequence, the remaining images of the sequence defining moving images, and re-aligning at least one portion of a moving image with respect to the reference image. The step of re-aligning may include: defining a delimitation mask identifying a region on the reference image with which the at least one portion of the moving image has to be re-aligned, and a feature mask identifying a further region on the reference image within which the re-alignment is calculated, determining an optimized transformation for compensating a displacement of the moving image with respect to the reference image by optimizing a similarity measure, and transforming the at least one portion of the moving image according to the optimized transformation.

24 Claims, 17 Drawing Sheets

U.S. PATENT DOCUMENTS

2004/0062439 A1* 4/2004 Cahill et al. .................. 382/173
2004/0120569 A1* 6/2004 Hung et al. .................. 382/144

FOREIGN PATENT DOCUMENTS

WO WO 01/08082 A 2/2001

OTHER PUBLICATIONS

K. Wei, "Detection and Quantification of Coronary Stenosis Severity With Myocardial Contrast Echocardiography", Progress in Cardiovascular Diseases, vol. 44, No. 2, Sep./Oct. 2001, pp. 81-100.

Kevin Wei, Elizabeth Le, Jian-Ping Bin, Matthew Coggins, Jerrel Thorpe, Sanjiv Kaul: "Quantification of Renal Blood Flow With Contrast-Enhanced Ultrasound", Journal of the American College of Cardiology, 2001, pp. 1135-1140, vol. 37, No. 4, ISSN 0735-1097, published by Elsevier Science Inc.

Kharchakdjian R., Burns, P. N., and Henkelman M.: "Fractal Modeling of Microbubble Destruction-Reperfusion in Unresolved Vessels", IEEE Ultrasonics Symposium, 2001, pp. 1669-1673.

Rim S.-J., Leong-Poi, H., Lindner J. R., Couture D., Ellegala D., Mason H. Durieux M., Kassel N. F. and Kaul S.: "Quantification of Cerebral Perfusion With "Real-Time" Contrast-Enhanced Ultrasound", Circulation, 2001, vol. 104, pp. 2582-2587, issn: 1524-4539, published by American Heart Association.

Schlosser T., Pohl C., Veltmann C., Lohmaier S., Goenechea J., Ehlgen A., Koster J., Bimmel D., Kuntz-Hehner S., Becher H., Tiemann K.: "Feasibility of the Flash-Replenishment Concept in Renal Tissue: Which Parameters Affect the Assessment of the Contrast Replenishment?", Ultrasound in Med. & Biol., 2001, vol. 27, No. 7, pp. 937-944.

Murthy T. H, Li P., Locvicchio E., Baisch C., Dairywala I., Armstrong W. F., Vannan M.: "Real-Time Myocardial Blood Flow Imaging in Normal Human Beings with the use of Myocardial Contrast Echocardiography", Journal of the American Society of Soc Echocardiography, Jul. 2001, vol. 14, No. 7, pp. 698-705.

Wei K., Jayaweera A. R., Firoozan S., Linka A., Skyba D. M., and Kaul S., "Quantification of Myocardial Blood Flow With Ultrasound-Induced Destruction of Microbubbles Administered as a Constant Venous Infusion," Circulation, Journal of the American Heart Association, 1998, vol. 97, pp. 473-483.

* cited by examiner

IMAGE REGISTRATION METHOD AND APPARATUS FOR MEDICAL IMAGING BASED ON MULTIPLE MASKS

PRIORITY CLAIM

This application claims priority to PCT Application No. PCT/EP2005/053871 filed Aug. 5, 2005, which claims priority to European Patent Application No. 04103825.8 filed Aug. 9, 2004, which are incorporated herein by reference.

TECHNICAL FIELD

An embodiment of the present invention relates to the medical imaging field. More specifically, an embodiment of the present invention relates to image registration techniques for use in medical imaging.

BACKGROUND

Medical imaging is a well-established technique in the field of equipments for medical applications. Particularly, this technique is commonly exploited for the assessment of blood perfusion, which finds use in several diagnostic applications and especially in ultrasound analysis. For this purpose, an ultrasound contrast agent (UCA), typically in the form of a suspension of gas bubbles in a liquid carrier, is administered to a patient. The contrast agent acts as an efficient ultrasound reflector, so that it can be easily detected by applying ultrasound waves and recording a resulting echo signal. As the contrast agent flows at the same velocity as the blood in the patient, its tracking provides information about the perfusion of the blood in a body part to be analyzed.

Gas bubbles are typically stabilized using emulsifiers, oils, thickeners or sugars, or by entraining or encapsulating the gas or a precursor thereof into a variety of systems. Stabilized gas bubbles are generally referred to as "gas-filled microvesicles". Gas-filled microvesicles include gas bubbles dispersed in an aqueous medium and bound at the gas/liquid interface by a very thin envelope involving a surfactant (i.e., an amphiphilic material). These microvesicles (also known as "microbubbles"), are prepared by contacting powdered amphiphilic materials, e.g. freeze-dried preformed liposomes or freeze-dried or spray-dried phospholipid solutions, with air or other gas and then with an aqueous carrier, and agitating to generate a microbubble suspension which is then administered shortly after its preparation.

Alternatively, the microvesicles include suspensions in which the gas bubbles are surrounded by a solid material envelope formed of natural or synthetic polymers (in this case, they are also known as "microballoons" or "microcapsules"). Another kind of ultrasound contrast agent includes suspensions of porous microparticles of polymers or other solids, which carry gas bubbles entrapped within the pores of the microparticles.

Examples of suitable aqueous suspensions of microvesicles, in particular microbubbles and microballoons, and of the preparation thereof are disclosed, for instance, in EP-A-0458745, WO-A-91/15244, EP-A-0554213, WO-A-94/09829 and WO-A-95/16467 which are incorporated by reference. An example of a commercial ultrasound contrast agent comprising gas-filled microvesicles is SonoVue® (Bracco International BV).

In a perfusion assessment process, the microvesicles are typically destroyed by an ultrasound pulse of sufficient energy (called "high mechanical index"). Observation of the replenishment rate of the microvesicles in the body-part under analysis provides information about its physiological conditions. This technique has been proposed for the first time in Wei, K., Jayaweera, A. R., Firoozan, S., Linka, A., Skyba, D. M., and Kaul, S., "Quantification of Myocardial Blood Flow With Ultrasound-Induced Destruction of Microbubbles Administered as a Constant Venous Infusion," Circulation, vol. 97 1998 which is incorporated by reference.

For this purpose, the flow of the contrast agent is monitored by acquiring a sequence of consecutive images representing the body-part after the destruction of the microvesicles. The images are then analyzed to obtain a time-curve that represents the change in intensity of each basic area of the images. These perfusion curves are fitted to mathematical models, in order to extract quantitative parameters of the perfusion process. Examples of the above-mentioned process (also known as parametric perfusion analysis) are described, for instance, in WO-A-02/102251 and in the following publications: K. Wei, Detection and Quantification of Coronary Stenosis Severity With Myocardial Contrast Echocardiography, Progress in Cardiovascular Diseases, 44(2), 2001, 81-100; Kevin Wei, Elizabeth Le, Jian-Ping Bin, Matthew Coggins, Jerrel Thorpe, Sanjiv Kaul. Quantification of Renal Blood Flow With Contrast-Enhanced Ultrasound. J. Am Coll Cardiol, 2001; 37:1135-40; Kharchakdjian, R., Burns, P. N., and Henkelman, M. Fractal Modeling of Microbubble Destruction-Reperfusion in Unresolved Vessels. IEEE Ultrasonics Symposium, 2001; Rim, S.-J., Leong-Poi, H., Lindner, J. R, Couture, D., Ellegala, D., Masson, H. Durieux, M, Kasse, N. F. and Kaul S., Quantification of Cerebral Perfusion with Real-Time Contrast-Enhanced Ultrasound, Circulation, vol. 104, 2001, 2582-2587; Schlosser et al, Feasibility of the Flash-Replenishment Concept in Renal Tissue: Which Parameters Affect the Assessment of the Contrast Replenishment?, Ultrasound in Med. & Biol., Vol. 27, pp 937-944, 2001; and Murthy T H, Li P, Locvicchio E, Baisch C, Dairywala I, Armstrong W F, Vannan M. Real-Time Myocardial Blood Flow Imaging in Normal Human Beings with the use of Myocardial Contrast Echocardiography. J Am Soc Echocardiogr, 2001, 14(7):698-705, which are incorporated by reference.

However, the accuracy of the perfusion assessment is adversely affected by the noise resulting from the inevitable misalignment of the images. For example, this can be due to the motion of the patient, to his/her respiratory cycle or to the involuntary movement of a measuring probe. This seriously degrades the quality of the results of the perfusion assessment. The problem is particularly acute in parametric imaging of the perfusion process; indeed, this technique requires precise alignment of the images, since any error caused by their misalignment seriously impairs the calculation of the corresponding quantitative parameters. All of the above hinders the clinical application of the above-described technique.

In order to solve this problem, the images must be re-aligned before being analyzed. For this purpose, an image of the sequence is selected as a reference; the other images (called moving images) are then re-aligned with respect to the reference image. In this way, the representation of the body-part to be analyzed remains substantially stationary.

Typically, the re-alignment is carried out manually by an operator. However, this solution is very time-consuming; moreover, the quality of the result is strongly dependent on the skill of the operator. Therefore, the manual re-alignment is not feasible in most practical applications.

Some solutions for re-aligning the images automatically have also been proposed in the last years. These solutions are based on image registration techniques, which aim at determining an optimal geometrical transformation mapping each moving image to the reference image.

For example, U.S. Pat. No. 6,490,560 which is incorporated by reference, discloses a registration method for calculating tissue perfusion using computer tomography (CT) scanners. The document discloses a method working on two-dimension images for re-aligning three-dimension volumes. In this case, each volume is represented by a sequence of (two-dimension) image slices segmenting the body-part under analysis. In the proposed method a central slice is selected in each sequence. A movement in two dimensions is determined for each central slice with respect to a reference central slice. Each volume is then corrected according to the corresponding movement. Alternatively, the same process can be repeated individually for each slice. The movement is determined by matching selected landmarks having constant shape and intensity (such as a portion of the skull). Optionally, the analysis can be restricted to a sub-region of interest so as to reduce processing time.

Moreover, U.S. Pat. No. 5,568,811, which is incorporated by reference, relates to a method of localizing tissue interfaces in ultrasound analysis. In this context, the document hints at the possibility of compensating the motion by correlating a small data cube between two different images.

However, none of the solutions known in the art is completely satisfactory. Indeed, the available registration methods provide relatively poor results in most practical situations. Particularly, the proposed solutions do not ensure an adequate level of accuracy for the parametric imaging of the perfusion process. Furthermore, the presence of speckle grains in ultrasound images can hide the information actually relating to the perfusion assessment. This may introduce errors that further decrease the quality of the process.

SUMMARY

According to an embodiment of the present invention, the use of multiple masks for re-aligning the images is suggested.

Particularly, an embodiment of the present invention proposes an image registration method for use in medical imaging. The method starts with the step of providing a sequence of images; each image includes a digital representation of a body-part under analysis. A reference image is selected within the sequence (with the remaining images of the sequence that define moving images). A moving image (or at least one portion thereof) is then re-aligned with respect to the reference image. The step of re-aligning includes the following operations. At first, a delimitation mask (identifying a region on the reference image with which the moving image has to be re-aligned), and a feature mask (identifying a further region on the reference image within which the re-alignment is calculated) are defined. An optimized transformation for compensating a displacement of the moving image with respect to the reference image is then determined. This operation is performed by optimizing a similarity measure, which may be calculated in three alternative ways. In a first implementation, the similarity measure is calculated between a first computation region (which is identified on the reference image by a computation mask) and a second computation region (which is identified by the computation mask on the moving image transformed according to a proposed transformation); the computation mask is determined by the intersection between the delimitation mask transformed according to the proposed transformation and the feature mask. In a second implementation, the similarity measure is calculated between a first computation region (which is identified by a computation mask on the reference image transformed according to a proposed transformation) and a second computation region (which is identified by the computation mask on the moving image); the computation mask is determined by the intersection between the feature mask transformed according to the proposed transformation and the delimitation mask. In a third implementation, the similarity measure is calculated between a first computation region (which is identified on the reference image by a computation mask transformed according to the reverse of a proposed transformation) and a second computation region (which is identified by the computation mask on the moving image); the computation mask is again determined by the intersection between the feature mask transformed according to the proposed transformation and the delimitation mask. The moving image, or its relevant portion(s), is then transformed according to the optimized transformation.

Particularly, this result is achieved by applying the optimized transformation itself in the first implementation, or the reverse of the optimized transformation in the second and third implementations.

In an embodiment of the invention, the optimized transformation for each moving image is determined through an iterative process; the process involves the execution of a loop one or more times, until the similarity measure (or a change thereof) reaches a threshold value.

Typically, the same operation is repeated for each further moving image of the sequence.

In a particular embodiment of the invention, the feature mask is defined inside the delimitation mask.

Advantageously, the feature mask is larger than 50% of the delimitation mask.

As a further enhancement, a mutual information measure is exploited (for example, consisting of the normalized mutual information between the two computation regions).

Another embodiment of the invention comprises sub-sampling the images before their processing; this operation is based on sub-sampling factors, which are calculated according to a spatial resolution along each dimension of the reference image (identifying the smallest significant elements that can be discriminated).

As a further enhancement, the spatial resolution is estimated in a rectangular region of the reference image that is derived from the feature mask.

A way to improve the performance of the method is of initializing the proposed transformation for each moving image according to the optimized transformations for one or more previous moving images.

Preferably, the initialization is carried out by means of a predictive algorithm based on the optimized transformations for a plurality of previous moving images.

As a further improvement, some moving images (whose number is determined according to a gradient of the optimized transformation for a current moving image) may be skipped during the optimization procedure; the optimized transformation for each skipped moving image is then obtained by interpolation.

In another embodiment of the invention, the reference image differs from the boundary images of the sequence (i.e., the first and the last ones), in order to partition it into two sub-sequences.

A suggested choice for the (proposed and optimized) transformation consists of a rigid transformation, which is defined by a corresponding displacement (i.e., one or more translations and/or one or more rotations).

As a further improvement, any visualizing elements of each moving image being outside the delimitation mask before or after applying the optimized transformation are discarded.

In another embodiment of the invention, the images are reduced by discarding the visualizing elements that have been discarded in at least one of them; the reduced images so obtained are then used for the analysis.

In specific applications (such as in the perfusion assessment), further visualizing elements are discarded in each image. For this purpose, the method identifies a most intense image and a least intense image in the sequence (for example, according to their average brightness); the visualizing elements to be discarded consist of the ones for which the difference between the corresponding visualizing elements in the most intense image and in the least intense image is lower than a threshold value.

As a possible extension, each image includes a plurality of frames (representative of corresponding slices of the body-part); in this case, the delimitation mask and the feature mask are defined on two or more of the frames.

Typically, a method according to an embodiment of the invention is applied in ultrasound imaging applications.

Without detracting from its generality, the proposed method is specifically designed for use in a perfusion assessment.

A further embodiment of the present invention proposes a computer program for performing the above-described method.

A still further embodiment of the present invention proposes a product embodying that program.

A different embodiment of the present invention provides a corresponding image registration apparatus.

Moreover, another embodiment of the present invention proposes a medical imaging system including the registration apparatus.

Features and advantages of one or more embodiments of the invention will be best understood by reference to the following detailed description, given purely by way of a non-restrictive indication, to be read in conjunction with the accompanying drawings.

DETAILED DESCRIPTION

Figure 1:
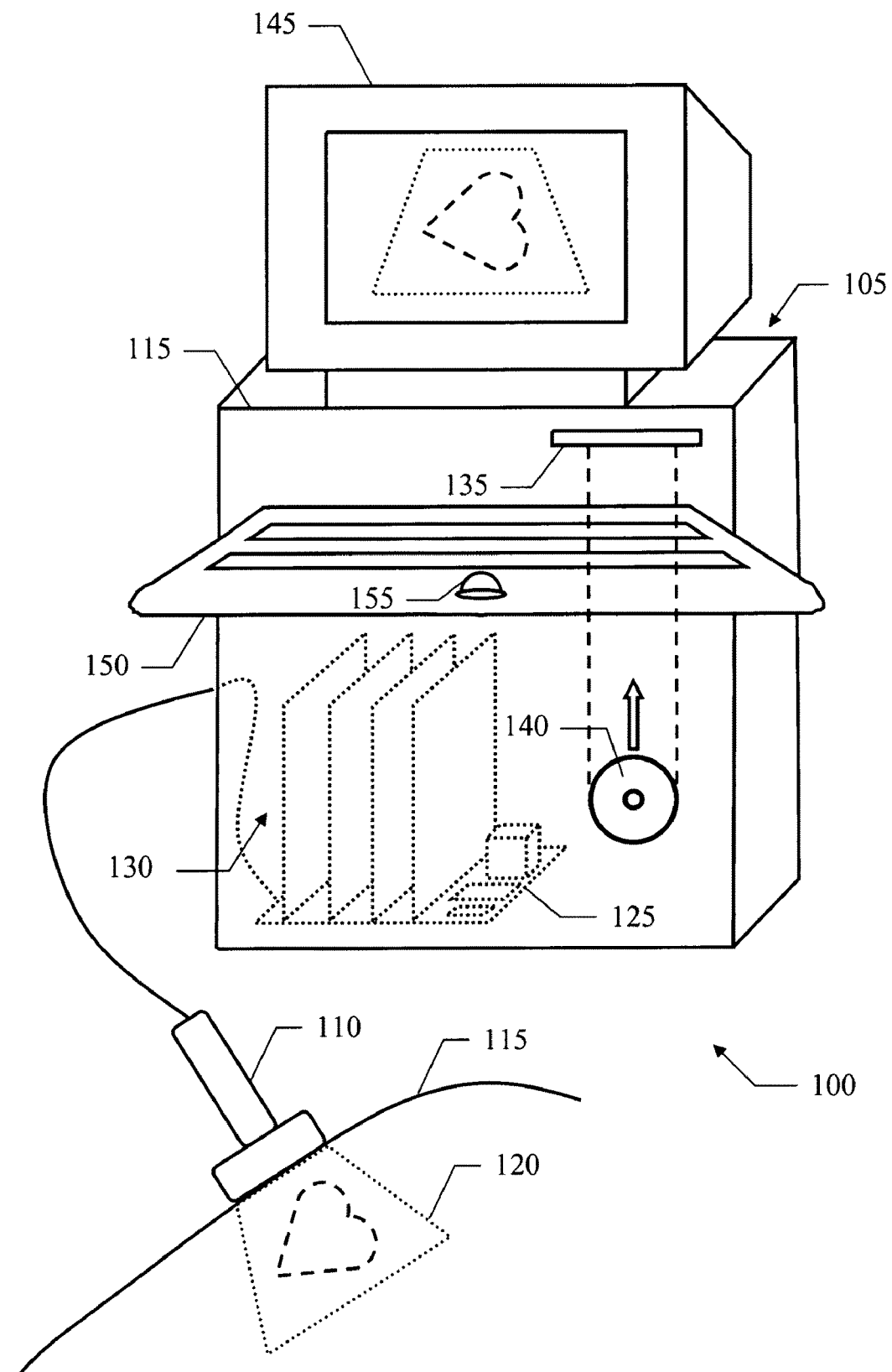
FIG. 1 is a pictorial representation of a medical imaging system in which the solution according to an embodiment of the invention is applicable.

With reference in particular to FIG. 1, a medical imaging system 100 is illustrated. The system 100 consists of an ultrasound scanner having a central unit 105 with a hand-held transmit-receive array probe 110 (of the linear or matrix type). The probe 110 transmits ultrasound waves (for example, having a center frequency between 2 and 10 MHz), and receives echo signals resulting from the reflections of the ultrasound waves by tissue structures and/or contrast-agent (when in contact with the skin of a patient 115 in the area of a body-part 120 to be analyzed); for this purpose, the probe 110 is provided with a transmit/receive multiplexer, which allows using the probe 110 in the above-mentioned pulse-echo mode.

The central unit 105 houses a motherboard 125, on which the electronic circuits controlling operation of the scanner 100 (such as a microprocessor, a working memory and a hard-disk drive) are mounted. Moreover, one or more daughter boards (denoted as a whole with 130) are plugged on the motherboard 125. The daughter boards 130 provide the electronic circuits for driving the probe 110; typically, those electronic circuits include beam formers and pulsers for generating the ultrasound waves, pre-amplifiers with time-gain compensation (TGC) circuits, analog-to-digital converters (ADCs) for processing the echo signals, a 3D builder, and a scan converter for representing the echo-signals as images.

The scanner 100 can also be equipped with a drive 135 for reading removable data-support media 140 (such as CD-ROMs). A monitor 145 is used to display an image representing the body-part 120 under analysis. Moreover, a keyboard 150 is connected to the central unit 105 in a conventional manner; the keyboard 150 is provided with a trackball 155, which is used to manipulate the position of a pointer (not shown in the figure) on a screen of the monitor 145.

Figure 2A:
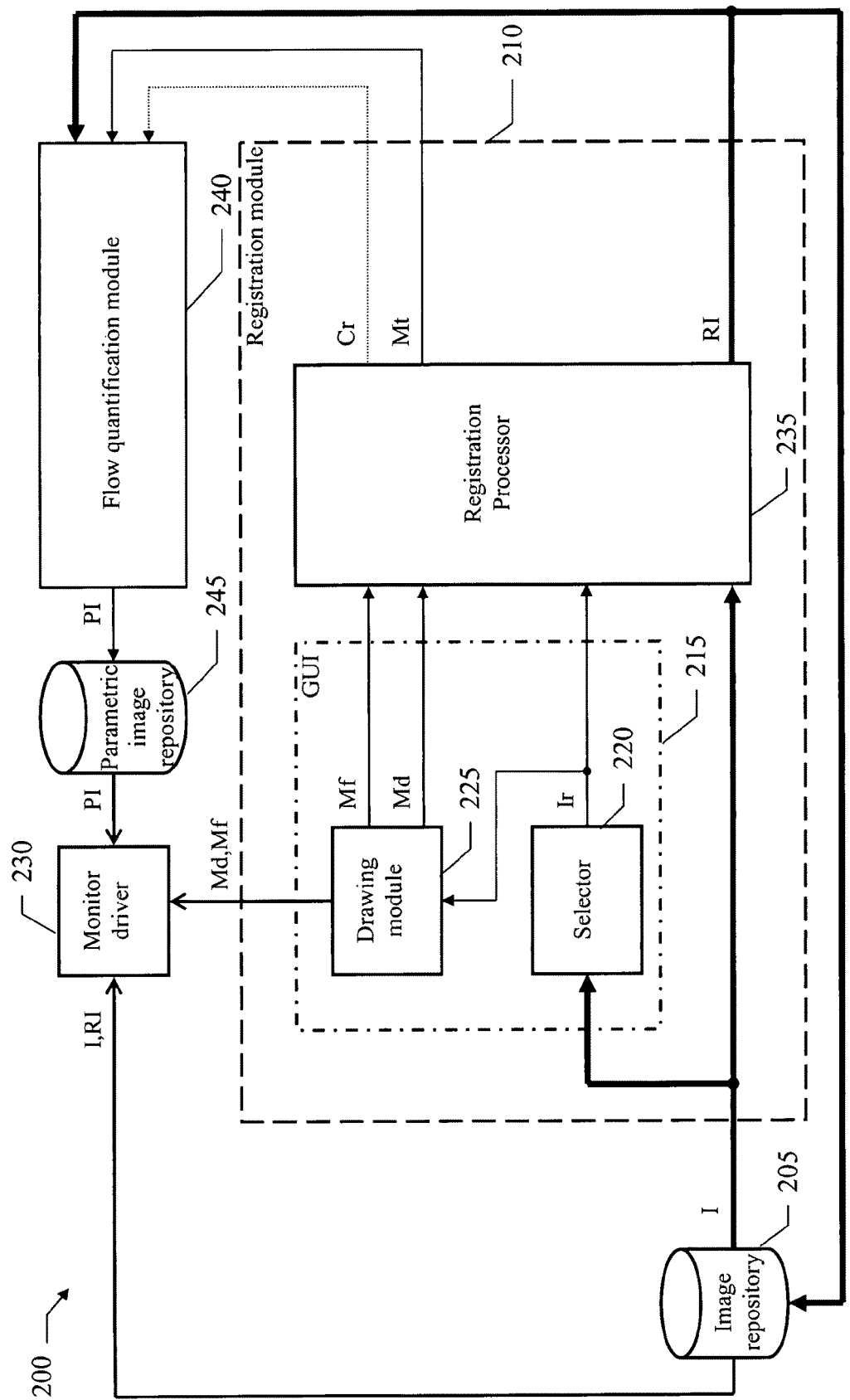
FIG. 2a depicts the main software components that can be used for practicing the solution according to an embodiment of the invention.

Moving to FIG. 2a, the main software components that can be used for practicing the solution according to an embodiment of the invention are denoted as a whole with the reference 200. The information (programs and data) is typically stored on the hard-disk and loaded (at least partially) into the working memory when the programs are running, together with an operating system and other application programs (not shown in the figure). The programs are initially installed onto the hard-disk from one or more CD-ROMs. In the following figures, any matrix will be denoted with a solid arrow, while the corresponding video representation will be denoted with an open arrow; moreover, any sequence consisting of a temporal series of generic objects will be denoted with a bold arrow, and any vector consisting of a set of values will be denoted with a dotted arrow.

Particularly, a repository 205 is used to store a sequence of images I that has been acquired (for example, by the above-described scanner). For this purpose, the body part under analysis has preferably received an ultrasound contrast agent, such as those previously mentioned. The contrast agent can be administered as a continuous flow or as a bolus, such as by injection. Preferably, the body-part under analysis has undergone a perfusion process. Particularly, after a predetermined period of time (for example, a few seconds) allowing the contrast agent (comprised of gas-filled microvesicles) to reach the body-part to be analyzed, a high-energy ultrasound pulse is applied; the energy must be sufficient to cause the destruction of a significant portion of the microvesicles (for example, at least 50%) so as to allow the detection of a substantial variation of the received echo signals between the value measured right after their destruction and when a steady perfusion state (in the case of a continuous flow) or a maximum value of perfusion (in the case of bolus administration) is reached. A sequence of consecutive images of the body-part is then taken, in order to track the flow of the contrast agent into the body-part (for example, with a resolution of 30-80 ms).

Each image consists of a digital representation of the body-part; the image is defined by a plurality of visualizing elements, typically in the form of a matrix (for example, with M=512 rows and N=512 columns). Each visualizing element represents a basic area of the image, such as a picture element (pixel) or a volume element (voxel); typically, the visualizing element consists of a value (for example, of 8 bits) indicative of the echo intensity assigned to the pixel (or voxel), from 0 for the black to 255 for the white. Typically, the image is also manipulated through digital filters (for example, band-pass filters) and other signal conditioners (for example, post-beam-forming TGC); moreover, the image is further manipulated through a demodulator (to account for the amplitude of an echo-envelope) and non-linear conditioners (such as a log compressor). Preferably, each sequence of images I is encoded in the image repository 205 by means of a corresponding file. The file stores the number of rows (M) and columns (N) of each image, and the number of images in the sequence; the file then includes a stream of records representing the images (each one consisting of M×N bytes for the corresponding pixel values).

The sequence of images I is input to a registration module 210, which is used to re-align the images so as to compensate the corresponding motion of the body-part under analysis. The registration module 210 includes a Graphical User Interface (GUI) 215 for loading (and decoding) the images of the sequence I from the corresponding file stored in the repository 205. Particularly, the sequence of images I is provided to a selector 220; the selector 220 allows an operator to display the images and choose one of them as a reference image Ir, to which the other images of the sequence (called moving images) are to be re-aligned (through a registration process). Preferably, the reference image Ir is different from the boundary images of the sequence (i.e., the first one or the last one), so as to partition the sequence into a sub-sequence from the reference image Ir to the first image and another sub-sequence from the reference image Ir to the last image. In most practical applications, the reference image Ir then includes more valuable information so as to facilitate the registration process.

Figure 2B:
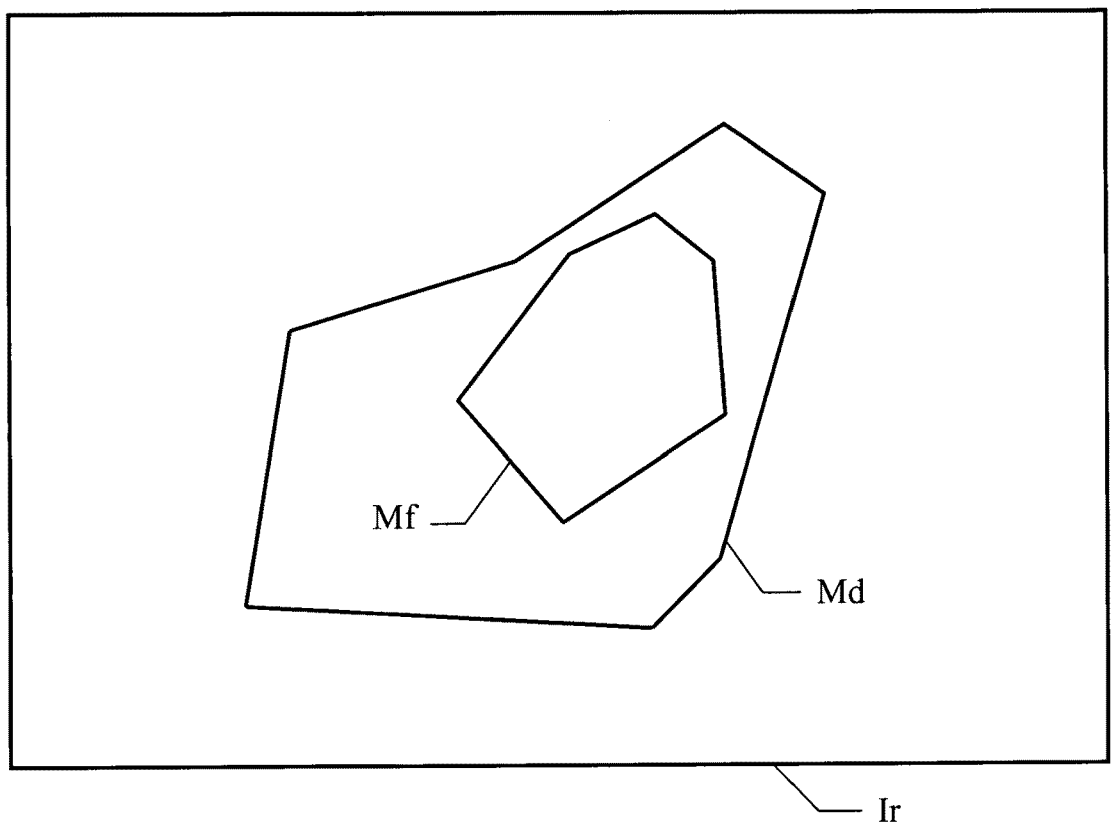
FIG. 2b is an example of a delimitation mask and of a feature mask that are used for re-aligning the images in an embodiment of the invention.

The reference image Ir is accessed by a drawing module 225, which is used to define a delimitation mask Md and a feature mask Mf thereon. The delimitation mask Md identifies a region of interest (ROI) for the analysis process (with which the moving images must be re-aligned). The definition of the delimitation mask Md takes into account a total excursion due to the motion to be compensated; the delimitation mask Md also allows the operator to discard areas of the images containing text and other unwanted information (if any). This allows applying the proposed solution in any system (irrespective of the format of the images that are provided). On the other hand, the feature mask Mf identifies a region (based on morphological features of the body part) that will be used for calculating the re-alignment. The drawing of the feature mask Mf typically benefits from the anatomical knowledge of the operator, so that the corresponding region includes the representation of relevant anatomical parts of the body-part under analysis. Preferably, the feature mask Mf is drawn inside the delimitation mask Md. Moreover, in most practical applications the feature mask Mf delimits a substantial portion of the reference image Ir. For example, the feature mask Mf is larger than 50% of the delimitation mask Md; preferably, the size of the feature mask Mf is 50%-80% (and still more preferably 55%-65%) of the size of the delimitation mask Md. This value provides a good compromise between the opposed requirements of high accuracy and low computation time. Typically, each mask Md,Mf is represented by a matrix of M×N bits; the bits inside the mask are assigned the logic value 1 whereas the bits outside the mask are assigned the logic value 0. An example of delimitation mask Md and feature mask Mf being drawn on the reference image Iris shown in FIG. 2b.

Referring back to FIG. 2a, for this purpose the video representations of the sequence of images I, of the delimitation mask Md and of the feature mask Mf are displayed through a monitor drive 230. The sequence of images I, the reference image Ir, the delimitation mask Md and the feature mask Mf are also supplied to a registration processor 235. The registration processor 235 compensates the motion of each moving image with respect to the reference image Ir, so as to obtain a corresponding sequence of registered images RI. The sequence of registered images RI is stored into the repository 205, and it is then available for displaying through the monitor drive 230.

The sequence of registered images RI is also supplied to a flow quantification module 240, which is used to calculate quantification parameters of the perfusion process. The flow quantification module 240 also receives the definition of a spatial resolution cell Cr and of a cutting mask Mt from the registration processor 235 (which significance will be evident in the following). The flow quantification module 240 outputs a parametric image PI, which provides a graphical representation of the results of the perfusion process. The parametric image PI is stored into a corresponding repository 245, and it is then available for displaying through the monitor drive 230.

Figure 3:
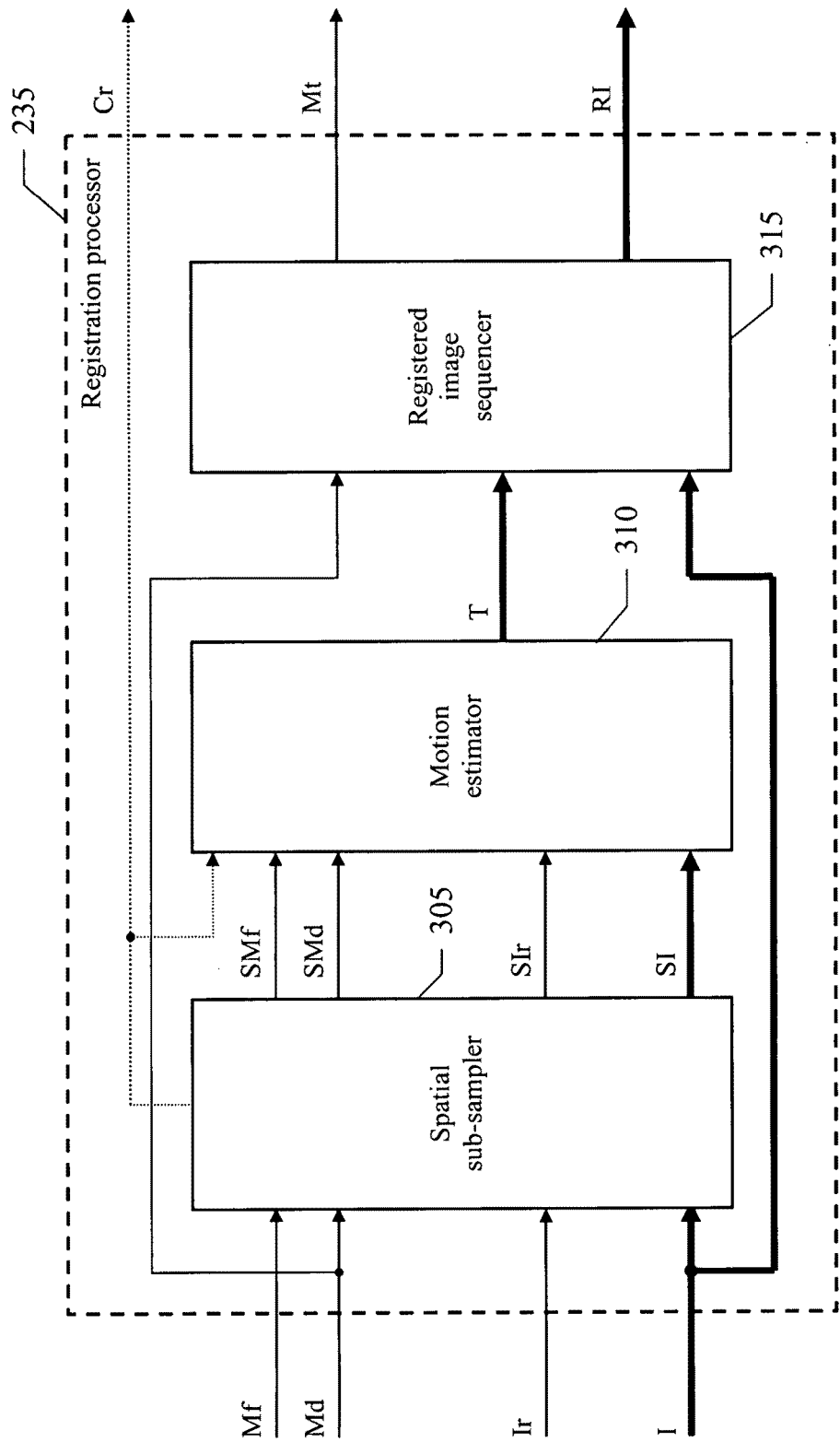
FIG. 3 shows a schematic block diagram of a registration processor according to an embodiment of the invention.

Moving to FIG. 3, the registration processor 235 consists of a spatial sub-sampler 305, a motion estimator 310 and a registered image sequencer 315 that are cascade-connected.

Particularly, the spatial sub-sampler 305 is used to reduce the amount of information to be processed. The spatial sub-sampler 305 receives the feature mask Mf, the delimitation mask Md, the reference image Ir, and the sequence of images I; the spatial sub-sampler 305 accordingly outputs a sub-sampled feature mask SMf, a sub-sampled delimitation mask SMd, a sub-sampled reference image SIr, and a sequence of sub-sampled images SI. This process also involves the determination of the spatial resolution cell Cr (which is provided to the flow quantification module).

The motion estimator 310 is used to determine a transformation compensating the motion of each image; for this purpose, the motion estimator 310 receives the sub-sampled feature mask SMf, the sub-sampled delimitation mask SMd, the sub-sampled reference image SIr, the sequence of sub-sampled images SI, and the spatial resolution cell Cr (from the spatial sub-sampler 305). Preferably, the transformation is of the rigid type (i.e., a transformation that preserves all the distances). In the example at issue, the transformation is defined by 3 components specifying a translation along an x-axis (X), a translation along a y-axis (Y) and a rotation angle (θ). The proposed choice provides good results with an acceptable computational complexity. As a result, the motion estimator 310 generates a corresponding sequence of transformations T, which is supplied to the registered image sequencer 315.

The registered image sequencer 315 also receives the delimitation mask Md and the sequence of images I. The registered image sequencer 315 updates the sequence of images I according to the sequence of transformations T, so as to generate the corresponding sequence of registered images RI. In addition, the registered image sequencer 315 determines the cutting mask Mt, which is provided to the flow quantification module.

Figure 4A:
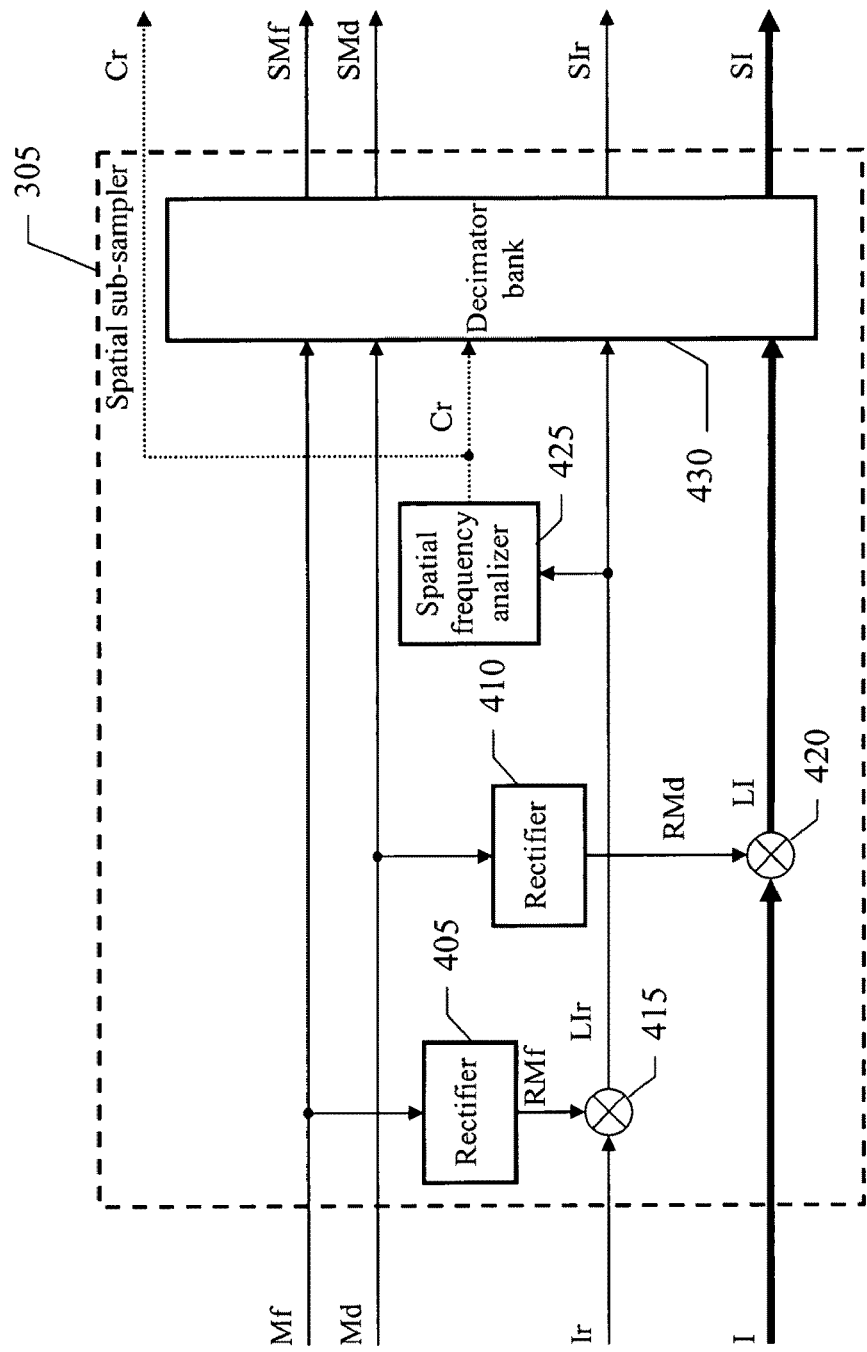
FIG. 4a details the structure of a spatial sub-sampler according to an embodiment of the invention.

Considering now FIG. 4a, the structure of the spatial sub-sampler 305 is illustrated in detail. Particularly, the feature mask Mf is provided to a rectifier 405, which determines a corresponding rectified feature mask RMf; the rectified feature mask RMf consists of the smallest rectangular including the feature mask Mf. Likewise, the delimitation mask Md is provided to a further rectifier 410, which determines a corresponding rectified delimitation mask RMd (consisting of the smallest rectangular including the delimitation mask Md).

The rectified feature mask RMf is applied to the reference image Ir through a multiplier operator 415. More in detail, each pixel value of the reference image Ir is multiplied by the corresponding logic value of the rectified feature mask RMf; as a result, the values of the pixels inside the rectified feature mask Mf are left unchanged, while the values of the other pixels are reset to 0 (so that they are discarded during the next processing). This operation generates a corresponding limited reference image LIr. Likewise, a sequence of limited images LI is generated by applying the rectified delimitation mask RMd to each image of the sequence I through a further multiplier operator 420.

The limited reference image LIf is input to a spatial frequency analyzer 425, which calculates the size of the spatial resolution cell Cr. The cell Cr defines a spatial resolution of the limited reference image LIf along each dimension thereof. The spatial resolution identifies the smallest significant elements that can be discriminated; particularly, in the case of ultrasound imaging the significant elements consist of speckle grains that are typically visible in the images. In the example at issue, the spatial resolution cell Cr is defined by two sub-sampling factors Px,Py (for the dimensions along the x-axis and the y-axis, respectively).

Figure 4B:
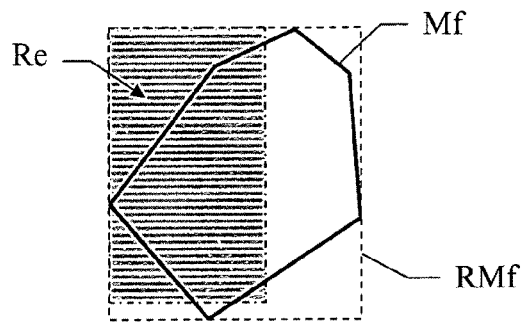
FIGS. 4b-4d depict different information used by the spatial sub-sampler in an embodiment of the invention.

For this purpose, the spatial frequency analyzer 425 extracts an estimation region Re from the limited reference image LIr; the estimation region Re includes the maximum power of 2 number of pixels in each dimension of a rectangular region defined by the rectified feature mask RMf (starting from its upper-left corner). An illustration of the feature mask Mf, the rectified feature mask RMf and the corresponding estimation region Re is shown in FIG. 4b. For example, if the rectified feature mask RMf has a size of 115×140 pixels, the estimation region Re will consists of 64×128=$2^6$×$2^7$ pixels.

Figure 4C:
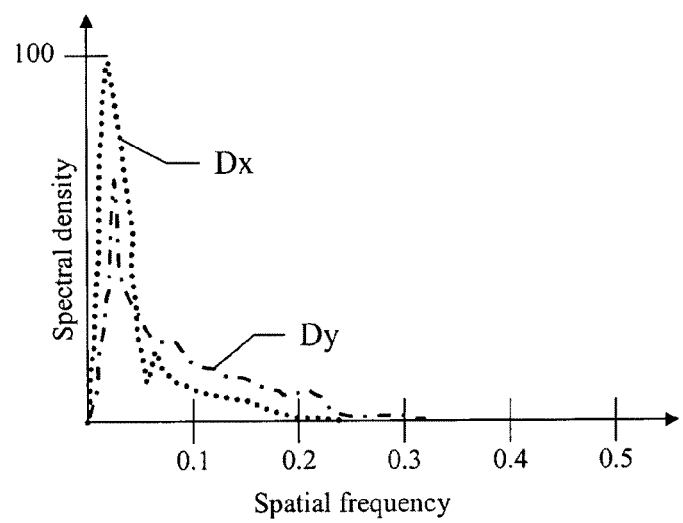

Referring back to FIG. 4a, the spatial frequency analyzer 425 determines the mean power spectral density of the estimation region Re along each dimension. Preferably, this process is carried out by applying a discrete Fourier Transform (such as the Fast Fourier Transform, or FFT) on each row and column of the estimation region Re, and then averaging the results so obtained for each dimension. Typically, the spatial frequency is expressed in units of "inverse of the number of pixels"; on the other hand, the mean power, spectral density is normalized between 0 and 100 (with the value 0 that is assigned to the corresponding DC component, so as to remove its effect). It should be noted that the rectangular shape of the estimation region Re avoids any boundary effect (which would be introduced by the possible irregular shape of the feature mask Mf); moreover, the selection of the size of the estimation region Re as a power of 2 increases the processing speed (since the FFT can be calculated by means of the Danielson-Lanczos Iemma). An example of distributions of the mean power spectral density along the x-axis (Dx) and the y-axis (Dy) is shown in FIG. 4c.

Figure 4D:
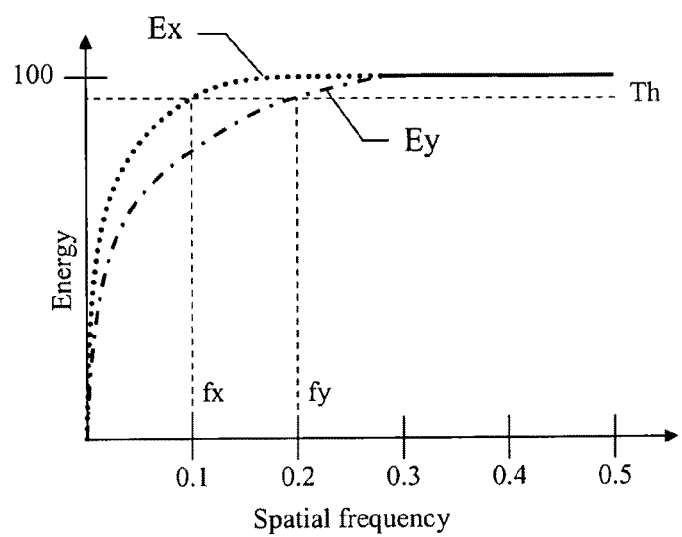

Considering now FIG. 4d, the density distributions Dx,Dy are integrated with respect to the spatial frequency, so as to obtain corresponding distributions Ex,Ey of the cumulative spectral energy. A threshold value Th that substantially preserves the energy is applied to the distributions Ex,Ey; preferably, the threshold value is comprised between 80% and 99.9%, more preferably between 85% and 99.5% and still more preferably between 90% and 99%, for example, 98%. The spatial frequencies providing the energy at the threshold value Th in the distributions Ex and Ey (denoted with fx and fy, respectively) are then determined. The sub-sampling factors Px and Py (defining the period of the sub-sampling in number of pixels) are given by the inverse of 2·fx and of 2·fy, respectively (rounded to an integer value). In the example shown in the figure, the spatial frequencies fx and fy providing the energy at the threshold value Th are equal to 0.1 and 0.2, respectively. Therefore, the sub-sampling factors Px and Py will be:

$$Px = \text{ROUND}\left[\frac{1}{2 \cdot fx}\right] = \text{ROUND}\left[\frac{1}{2 \cdot 0.1}\right] = 5,$$

$$Py = \text{ROUND}\left[\frac{1}{2 \cdot fy}\right] = \text{ROUND}\left[\frac{1}{2 \cdot 0.2}\right] = \text{ROUND}[2.5] = 2.$$

Returning to FIG. 4a, the spatial sub-sampler 305 further includes a bank of four decimators 430 (working in parallel). Each decimator 430 receives the spatial resolution cell Cr (which is also transmitted to the flow quantification module). The feature mask Mf, the delimitation mask Md, the limited reference image LIr and the sequence of limited images LI are provided to respective decimators 430, which output the corresponding sub-sampled feature mask SMf, sub-sampled delimitation mask SMd, sub-sampled reference image SIr and sequence of sub-sampled images SI. Each decimator 430 reduces the respective input matrix according to the resolution cell Cr, this strongly lowers the amount of data to be processed, without substantially affecting its information content (organ anatomy or morphology). For this purpose, the decimator 430 first of all applies a low-pass filtering to the input matrix. Preferably, this process is performed by means of a linear filter. More in detail, the input matrix is convolved with a kernel having Px rows and Py columns, with each cell of the kernel that is assigned the value 1/(Px·Py). As a result, each pixel of the input matrix is replaced with the mean value of the product of the kernel by the corresponding portion of the input matrix centered on the pixel. In this way, the content of the input matrix is low-pass filtered with a cut-off frequency depending on the sub-sampling factors Px and Py (along the x-axis and the y-axis, respectively). Therefore, any noise peaks (which would introduce errors in the next sub-sampling operation) is removed from the input matrix. The (filtered) input matrix is then re-sampled at a lower rate; in other words, the decimator 430 takes a pixel every Px along the x-axis and a pixel every Py along the y-axis. The above-described operation allows reducing the size of each input matrix by a factor proportional to Px·Py.

Figure 5A:
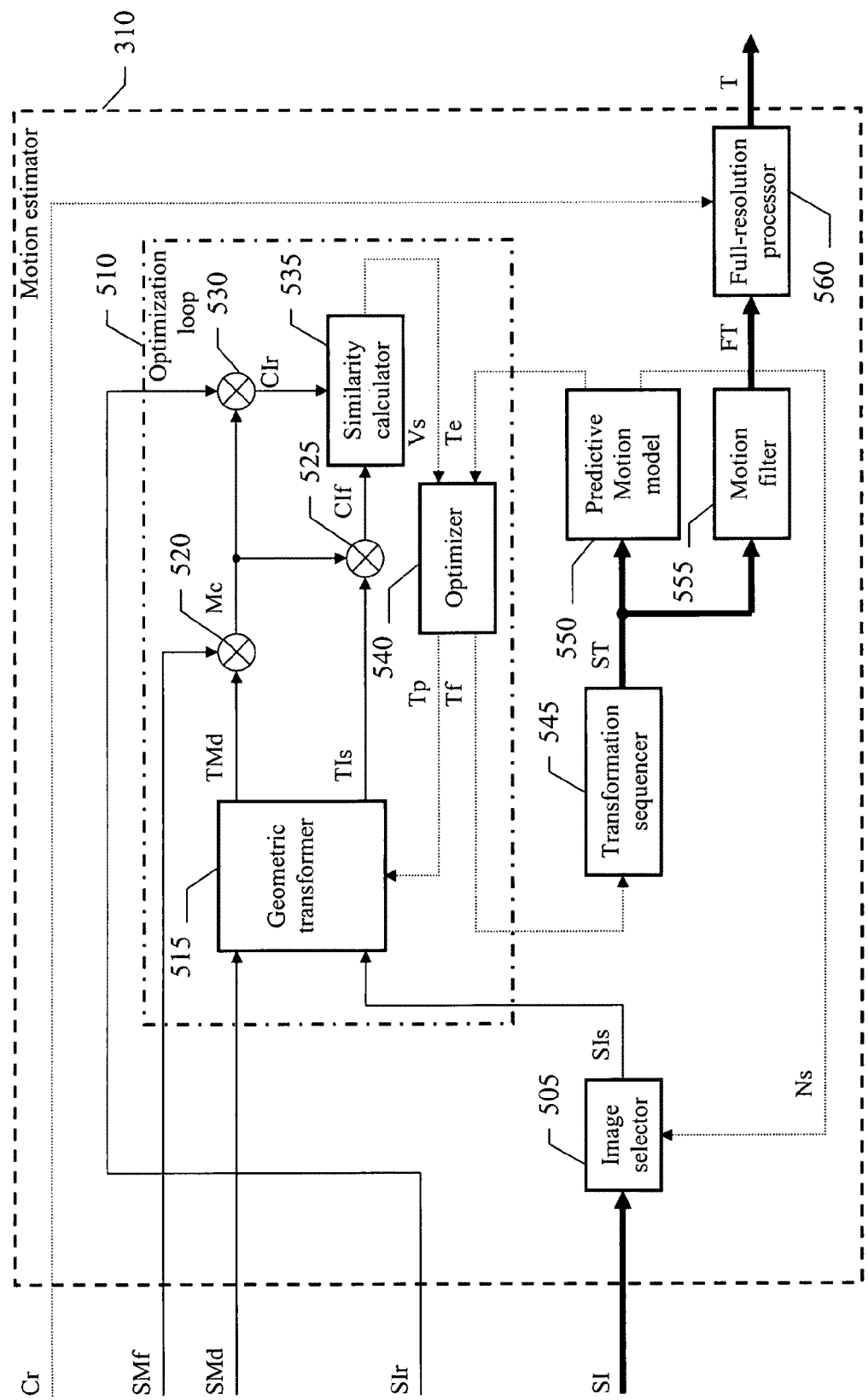
FIG. 5a details the structure of a motion estimator according to an embodiment of the invention.

With reference to FIG. 5a, the structure of the motion estimator 310 is illustrated in detail. Particularly, the sequence of sub-sampled images SI is provided to an image selector 505. The selector 505 extracts an image SIs from the sequence according to a selection parameter Ns defining its number. The selected sub-sampled image SIs is supplied to an optimization loop 510, which calculates the transformation that maximizes a similarity measure indicative of the alignment of the selected sub-sampled image SIs with respect to the sub-sampled reference image SIr. As described in the following, the optimization loop 510 works on a selected area of the images; this area represents the region, corresponding to the portion of the reference image identified by the feature mask, which remains inside the delimitation mask after applying the relevant transformation. Preferably, the optimization loop 510 implements a pixel-based algorithm, which works on the whole content of the above-mentioned area (so as to increase the robustness of the solution).

Figure 5B:
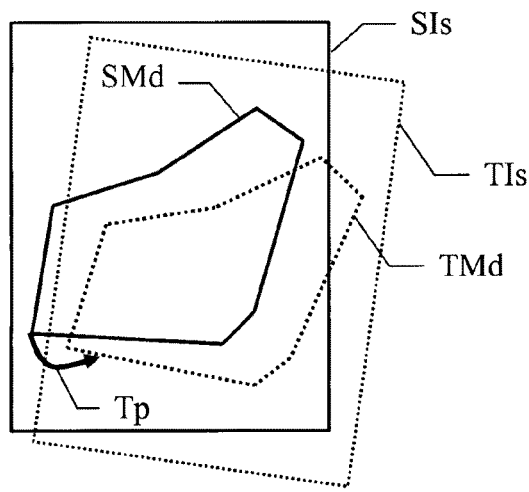
FIGS. 5b-5d depict different information used by the motion estimator in an embodiment of the invention.

More specifically, the selected sub-sampled image SIs is input to a geometric transformer 515; the geometric transformer 515 also receives the sub-sampled delimitation mask SMd and a proposed transformation Tp (generated as described in the following). The geometric transformer 515 moves the selected sub-sampled image SIs and the sub-sampled delimitation mask SMd according to the proposed transformation Tp, so as to obtain a corresponding transformed image TIs and transformed delimitation mask TMd (see FIG. 5b); for this purpose, the geometric transformer 515 is preferably provided with an interpolator (for example, based on the nearest neighbor algorithm), which provides a sub-pixel resolution.

Figure 5C:
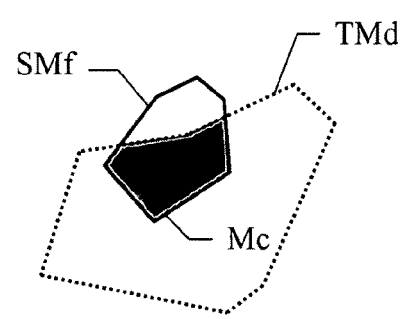

The transformed delimitation mask TMd is now applied to the sub-sampled feature mask SMf through a multiplier operator 520. This operation generates a computation mask Mc. The computation mask Mc corresponds to the intersection of the transformed delimitation mask TMd with the sub-sampled feature mask SMf (see FIG. 5c); therefore, when the displacement of the transformed delimitation mask TMd (corresponding to the proposed transformation Tp) causes the sub-sampled feature mask SMf to exit the transformed delimitation mask TMd, the computation mask Mc will consist of the portion of the sub-sampled feature mask SMf inside the transformed delimitation mask TMd.

A computation-limited floating image CIf is then generated by applying the computation mask Mc to the transformed image TIs (through a multiplier operator 525); likewise, a computation-limited reference image CIr is generated by applying the same computation mask Mc to the sub-sampled reference image SIr (through a further multiplier operator 530). The computation-limited floating image CIf and the computation-limited reference image CIr are input to a similarity calculator 535; the calculator 535 provides a similarity measure Vs indicative of the alignment of the computation-limited floating image CIf with respect to the computation-limited reference image CIr. As a consequence, the computation of the similarity measure Vs is limited to the portions of the two images delimited by the computation mask Mc (wherein valuable information is available on both images); in this way, it is possible to avoid any degradation of the results of the perfusion assessment caused by visualizing elements outside the region defined by the sub-sampled delimitation mask SMd on the sub-sampled reference image SIr.

Advantageously, the similarity measure Vs consists of the normalized mutual information (NMI). This is a measure used in information theory, which is based on entropy measures of the images to be re-aligned. Particularly, denoting with $p_{(a)}$ and $p_{(b)}$ the probability distributions of the pixel values in two generic images A and B, respectively (computed using their histograms), the corresponding marginal entropies H(A) and H(B) are:

$$H(A) = -\Sigma p_{(a)} \cdot \log [p_{(a)}]$$

$$H(B) = -\Sigma p_{(b)} \cdot \log [p_{(b)}]$$

The marginal entropies H(A) and H(B) indicate the information content (i.e., the uncertainty) of the images A and B, respectively (with the entropy that is higher when the histograms of the images A,B are homogeneous and decreases when they exhibit many broad peaks).

Likewise, the joint entropy H(A,B) of the images A and B is given by:

$$H(A,B) = -\Sigma p_{(a,b)} \cdot \log [p_{(a,b)}]$$

wherein p(a,b) is the joint probability distribution computed from the joint histogram of the images A and B. The joint entropy H(A,B) measures the information content of the two images A and B when combined. Therefore, the joint entropy H(A,B) is minimal when the two images A and B are optimally aligned and increases with their misalignment (due to the appearing of new peaks in the joint histogram). However, the joint entropy H(A,B) can be calculated only on the overlapping region of the two images A and B, so it varies with the extent of the overlapping.

The solution to this problem is given by the mutual information MI(A,B), which is defined as the difference between the sum of the marginal entropies H(A) and H(B) and the corresponding joint entropy H(A,B) in the overlapping region of the two images A and B:

$$MI(A,B) = H(A) + H(B) - H(A,B)$$

In this way, the joint entropy H(A,B) is normalized with respect to the marginal entropies H(A) and H(B), and the dependence on the extent of the overlapping region is substantially reduced. However, changes in the overlap of very low intensity regions of the images A and B (especially due to noise around them) can disproportionally contribute to the mutual information MI(A,B). Improvement can be obtained by normalizing the mutual information MI(A,B) with various schemes; a suggested form of normalized mutual information NMI(A,B) is given by:

$$NMI(A,B) = [H(A) + H(B)] / H(A,B)$$

The normalized mutual information (hereinafter referred to simply as mutual information) is insensitive to the intensity of the pixels in the images to be re-aligned. Therefore, this similarity measure allows compensating the motion disregarding any structural differences (and especially the ones caused by the flux of the contrast agent into the body-part). This choice provides excellent results, especially in the perfusion assessment.

Advantageously, the mutual information is calculated only exploiting the joint histogram providing the joint entropy H(A,B). Particularly, each axis of the joint histogram specifies the pixel values in the images A and B, respectively; each point of the histogram then provides the joint probability of the corresponding pixel values in the two images A,B. Therefore, it is possible to calculate the probability distribution for each image by summing the joint probabilities along the axis of the other image (for each pixel value).

The similarity measure Vs output by the calculator 535 is supplied to an optimizer 540; the optimizer 540 also receives a predicted transformation Te, which is used for its initialization (so as to place the optimization procedure close to the optimum, thereby reducing the risk of falling in a local maximum). The optimizer 540 calculates the transformation that maximizes the mutual information (between the computation-limited floating image CIf and in the computation-limited reference image CIr) with an iterative procedure. This procedure is preferably based on the steepest gradient algorithm. Particularly, at each iteration the optimizer 540 calculates a preferred direction corresponding to the highest gradient of the mutual information. The derivative defining the gradient $\nabla NMI(x)$ is approximated in practice using a centered finite difference:

$$\nabla NMI(x)=[NMI(x+\Delta x)-NMI(x-\Delta x)]/2\cdot\Delta x.$$

The proposed transformation Tp is then calculated by maximizing the mutual information along the preferred direction; the proposed transformation Tp is provided to the geometric transformer 515, so as to iterate the process. The optimization procedure is terminated when the change in the mutual information falls below a threshold value (for example, 5-10%), or after a predetermined number of iterations (for example, 10-15). The chosen algorithm provides very accurate results with a low computation time; for example, the algorithm typically converges in less than 5 iterations.

Once the optimization procedure is terminated, a corresponding final transformation Tf is provided by the optimizer 540 to a transformation sequencer 545. The module 545 builds a sequence of sub-sampled transformations ST from the received values. For this purpose, the final transformation Tf (for the currently selected sub-sampled image SIs) is added to the sequence ST; assuming that one or more sub-sampled images of the sequence SI have been skipped by the image selector 505 (according to the selection parameter Ns), the transformations for those skipped sub-sampled images SIs are calculated by interpolation.

The sequence of sub-sampled transformations ST is supplied to a predictive motion model 550, which determines the selection parameter Ns (provided to the image selector 505 for extracting the next sub-sampled image SIs to be processed) and the corresponding predicted transformation Te (provided to the optimizer 540 for initializing the optimization procedure); for this purpose (although not shown in the figure for the sake of clarity), the predictive motion model 550 must also receive the total number of images in the sequence and the position of the reference image.

Preferably, the predictive motion model 550 calculates the gradient of each component (X, Y and θ) of the sub-sampled transformations of the sequence ST; for example, this operation is carried out simply determining the slope of the segment connecting each component of the last transformation with the corresponding component of the previous transformation in the sequence ST. The selection parameter Ns is then calculated according to the steepest one of the gradients. For example, two images are skipped in the sequence when the angular coefficient of the steepest gradient is lower than 0.5, one image is skipped when the angular coefficient is between 0.5 and 0.8, and no image is skipped when the angular coefficient is higher than 0.8. In this way, a high number of sub-sampled images of the sequence SI are skipped when they are substantially stationary (thereby avoiding unnecessary computations); on the contrary, a low number of sub-sampled images of the sequence SI (down to zero) are skipped when they exhibit sharp changes (thereby ensuring a good accuracy). This temporal sub-sampling strongly reduces the processing time; moreover, the procedure self-adapts to the dynamic of the moving images.

Figure 5D:
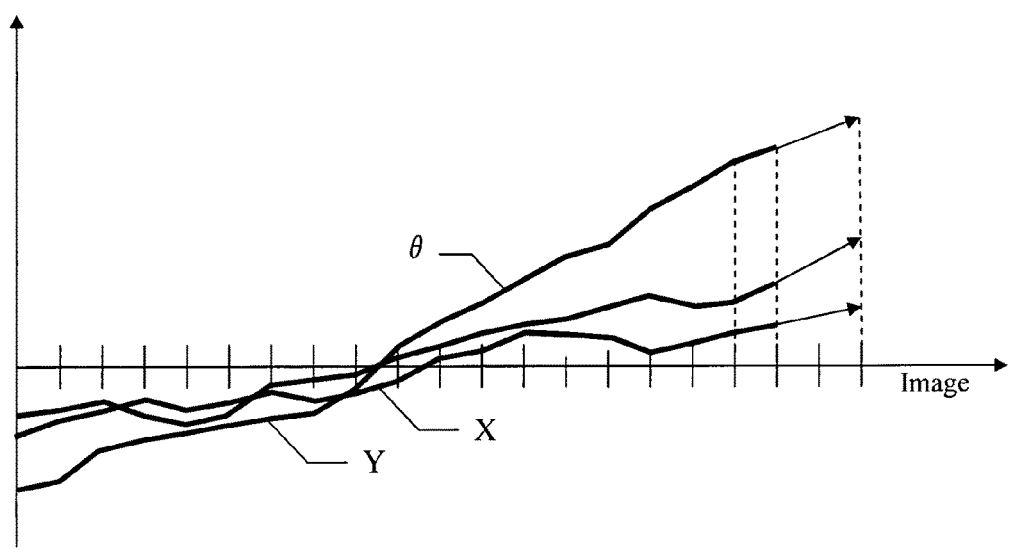

The predictive motion model 550 then calculates the predicted transformation Te for the next image to be processed (identified by the selection parameter Ns so obtained). For each component X, Y and θ of the transformation, this process is preferably carried out simply applying a linear extrapolation (from the last two available transformations). The components X, Y and θ of an exemplary sequence of transformations are depicted in FIG. 5*d*. In this case, the steepest gradient is given by the component θ (for example, with an angular coefficient of 0.6); as a result, a single sub-sampled image is skipped in the sequence SI. The values of each component (X, Y and θ) defining the predicted transformation Te are defined by the corresponding arrows. This choice strongly increases the probability of finding the best transformation as fast as possible.

Returning to FIG. 5*a*, the sequence of sub-sampled transformations ST (once complete) is supplied to a motion filter 555. The motion filter 555 smoothes the effects of the motion compensation by applying a low-pass filtering to each sub-sampled transformation of the sequence ST, so as to obtain a corresponding sequence of filtered transformations FT. A full-resolution processor 560 generates the sequence of transformations T from the sequence of filtered transformations FT; for this purpose, the translation components (X and Y) of each filtered transformation of the sequence FT are multiplied by the corresponding sub-sampling factors of the resolution cell Cr (Px and Py, respectively). The sequence of transformations T thus obtained is then transferred to the registered image sequencer.

Figure 6A:
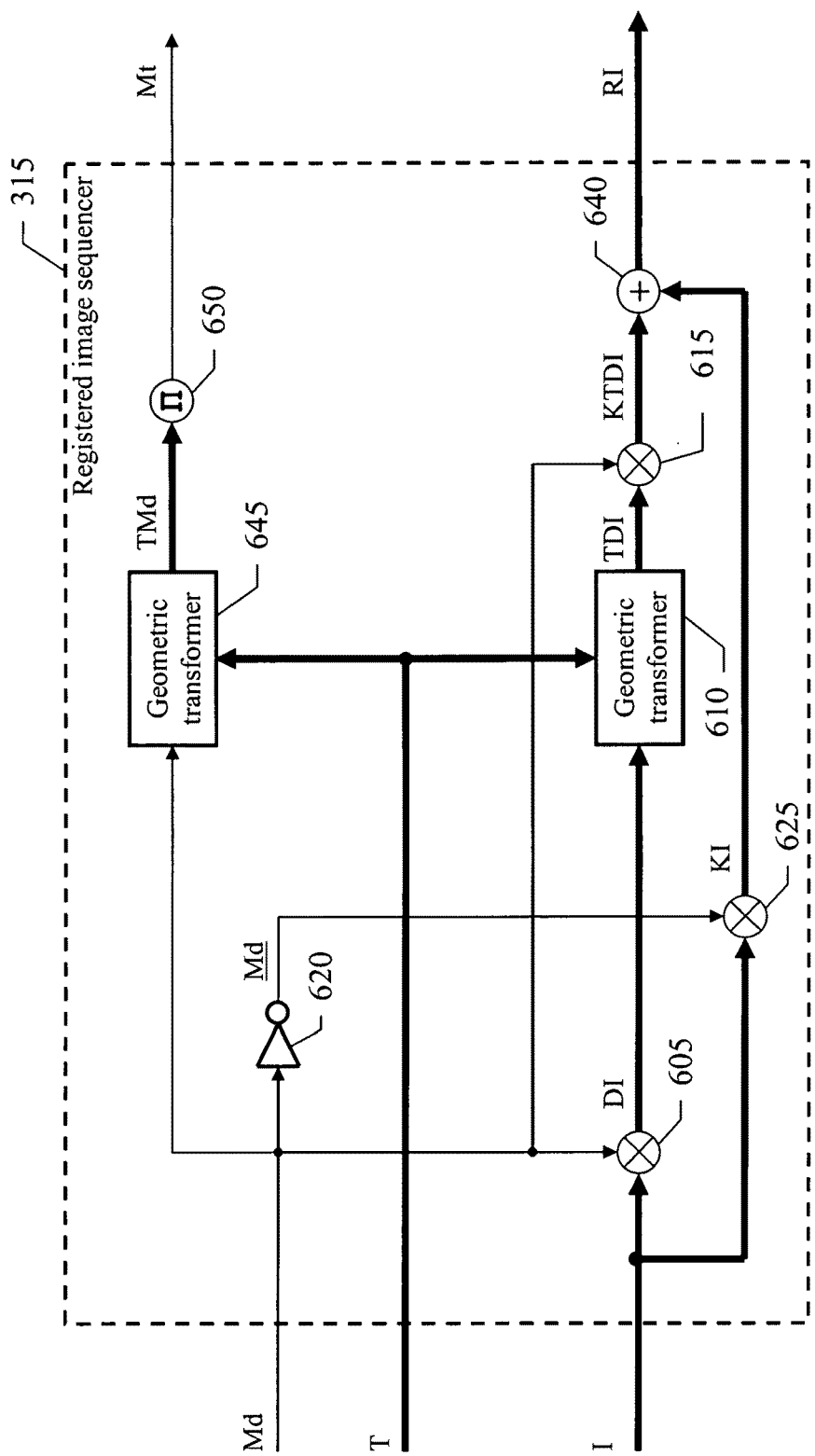
FIG. 6a details the structure of a registered image sequencer according to an embodiment of the invention.
Figure 6B:
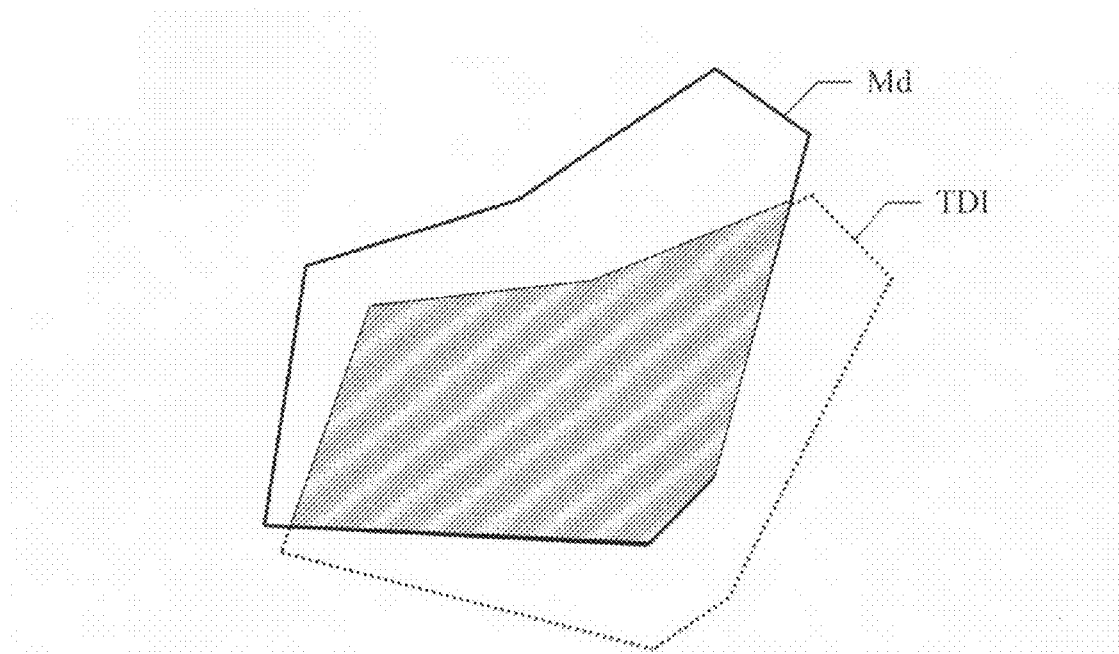
FIGS. 6b-6e depict different information used by the registered image sequencer in an embodiment of the invention.
Figure 6C:
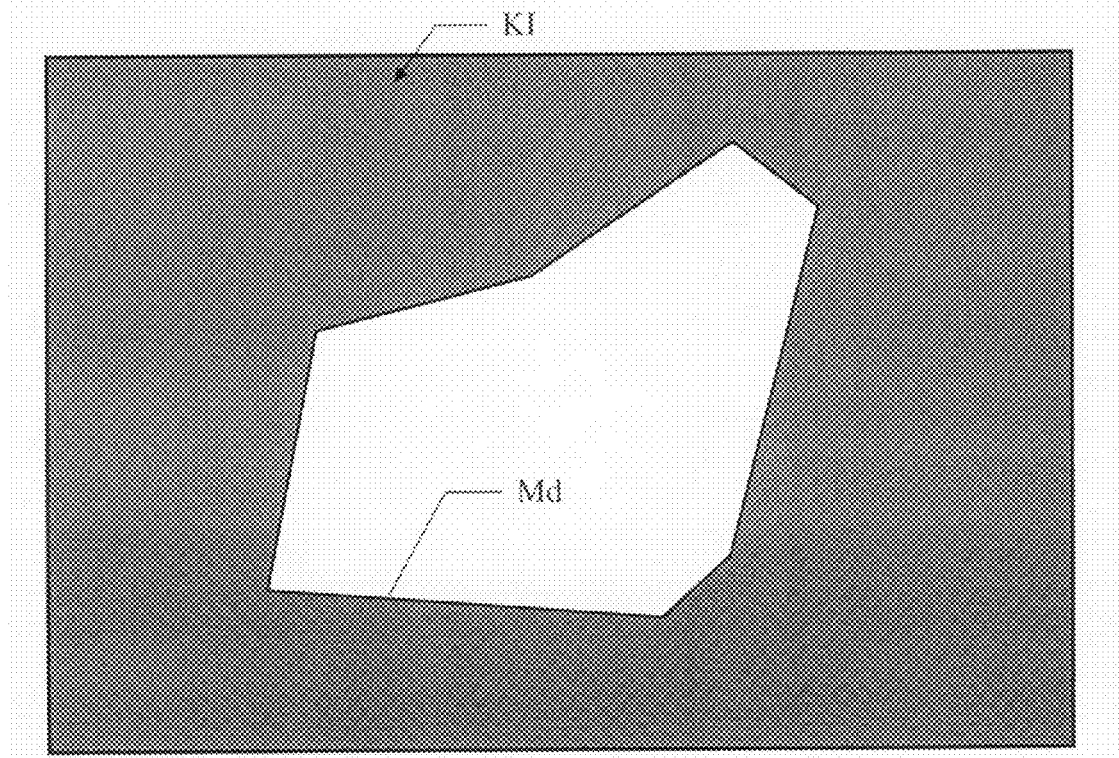
Figure 6D:
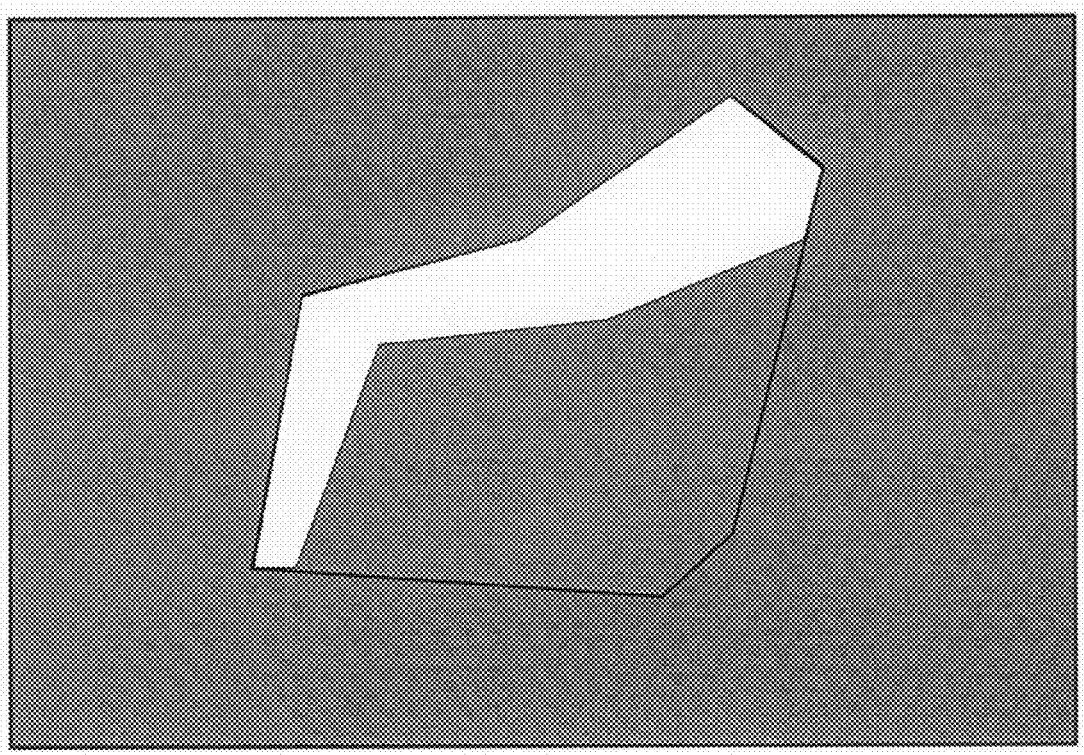

Passing to FIG. 6*a*, the structure of the registered image sequencer 315 is illustrated in detail. Particularly, the delimitation mask Md is applied to each image of the sequence I through a multiplier operator 605. This operation generates a corresponding sequence of delimited images DI. The sequence of delimited images DI and the sequence of transformations T are supplied to a geometric transformer 610. The geometric transformer 610 moves each delimited image of the sequence DI according to the corresponding transformation of the sequence T, so as to generate a sequence of transformed delimited images TDI. A sequence of masked delimited image KTDI is then obtained by applying the delimitation mask Md to each transformed delimited image of the sequence TDI through a multiplier operator 615 (see FIG. 6*b*). In this way, the pixels that were outside the delimitation mask Md (before applying the sequence of transformations T) and the pixels that move outside the delimitation mask Md (after applying the sequence of transformations T) are automatically discarded At the same time, the delimitation mask Md is provided to an inverter 620, which generates a corresponding inverted delimitation mask $\overline{Md}$. The inverted delimitation mask $\overline{Md}$ is applied to each image of the sequence I through a multiplier operator 625, so as to obtain a corresponding sequence of masked images KI; each masked image of the sequence KI then includes only the pixels that are outside the delimitation mask Md (see FIG. 6*c*). The sequence of masked images KI and the sequence of masked transformed delimited images KTDI are input to an adder operator 640. For each pair of images of the two sequences, the adder operator 640 calculates the sum of the corresponding values pixel-by-pixel; this operation generates the sequence of registered images RI. In this way, the region of each image delimited by the mask Md is re-aligned (removing the discarded pixels), while the portion of the image outside the mask Md is left unchanged (see FIG. 6*d*).

Figure 6E:
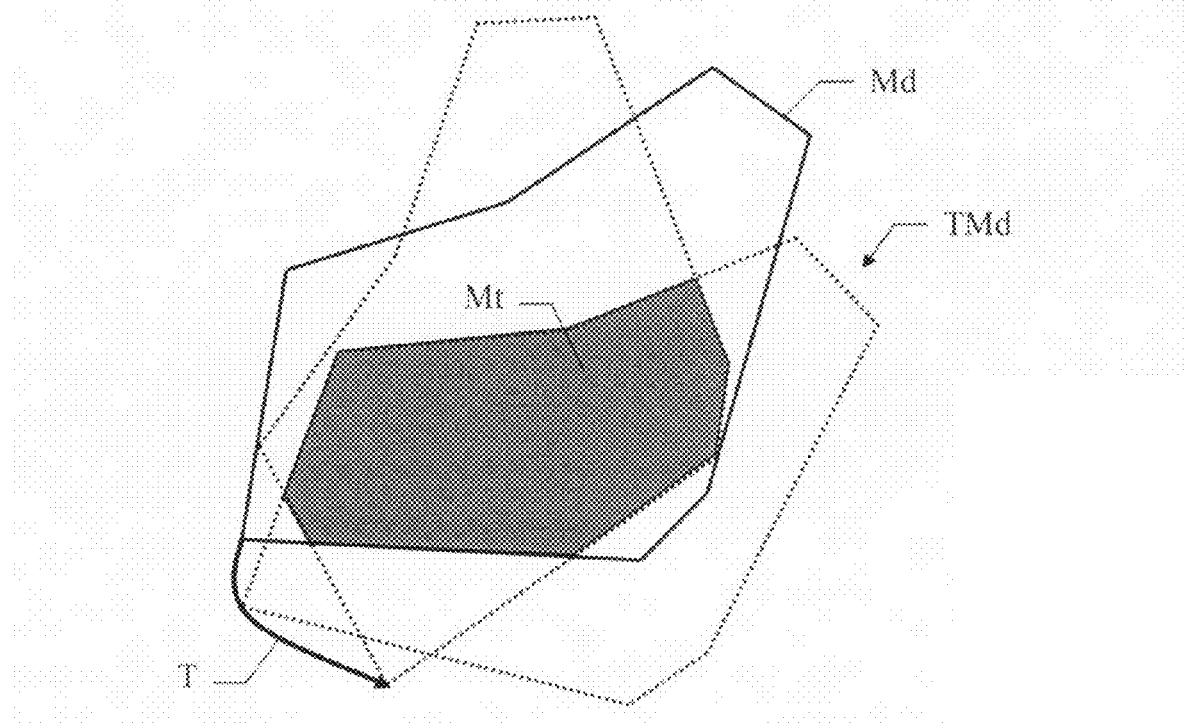

The registered image sequencer 315 includes a further geometric transformer 645, which receives the delimitation mask Md and the sequence of transformations T. The geometric transformer 645 applies each transformation of the sequence T to the delimitation mask Md, so as to generate a corresponding sequence of transformed delimitation masks TMd. The sequence of transformed delimitation masks TMd is provided to an intersection operator 650, which generates the cutting mask Mt (see FIG. 6e). In this way, the cutting mask Mt is limited to the portion of the delimitation mask Md wherein valuable information is available in all the registered images RI.

Figure 7:
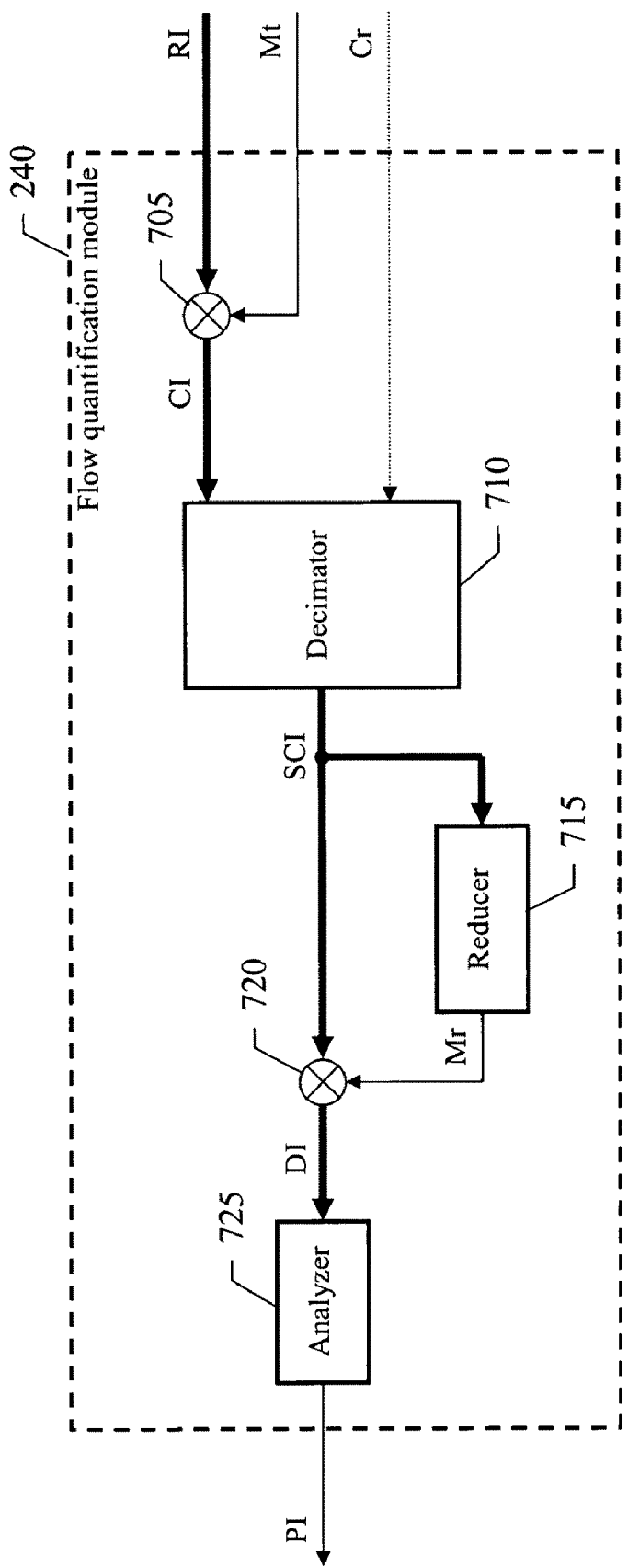
FIG. 7 details the structure of a flow quantification module according to an embodiment of the invention.

With reference now to FIG. 7, the structure of the flow quantification module 240 is illustrated in detail. Particularly, the cutting mask Mt is applied to each registered image of the sequence RI through a multiplier operator 705 (so that information of no interest in the images is automatically removed). This operation generates a corresponding sequence of cut images CI. The sequence of cut images CI and the spatial resolution cell Cr are supplied to a decimator 710. The decimator 710 is exactly the same as the ones described above with reference to the spatial sub-sampler of the registration processor; particularly, the decimator 710 applies a low-pass filtering and re-samples each cut image of the sequence CI according to the spatial resolution cell Cr, so as to obtain a corresponding sequence of sub-sampled cut images SCI.

The sequence of sub-sampled cut images SCI is input to a reducer 715, which outputs a reducing mask Mr. For this purpose, the reducer 715 at first calculates the average brightness of each sub-sampled cut image of the sequence SCI, in order to identify a brightest image and a darkest image of the sequence. The reducer 715 then calculates a difference image between the brightest image and the darkest image. Each pixel of the reducing mask Mr is assigned the logic value 1 if the corresponding pixel of the difference image is higher than an acceptable threshold value (for example, between 5% and 20% of the maximum value in the difference image), or it is assigned the logic value 0 otherwise. The reducing mask Mr is then applied to each sub-sampled cut image of the sequence SCI through a multiplier operator 720, so as to obtain a corresponding sequence of reduced images DI. In this way, the reduced images of the sequence DI only include the pixel values that exhibit a significant change within the sequence SCI; on the contrary, the pixels that are not affected by the flow of the contrast agent are discarded. In this way, the images are limited to the visualizing elements that provide significant information; this strongly reduces the errors caused by background noise in the images. It should be noted that the dynamic selection of the most intense image and of the least intense image of the sequence ensures the correct operation of the method irrespective of the technique being used for administering the contrast agent (for example, as a continuous flow or as a bolus).

The sequence of reduced images DI is supplied to an analyzer 725. The analyzer 725 calculates quantitative parameters of the perfusion process represented by those images. Typically, the analyzer 725 determines a time-curve that plots the changes in intensity of each pixel; this perfusion curve is then fitted to a mono-exponential model given by the following function of the pixel value (v) against the time (t):

$$v = A(1 - e^{-\beta t})$$

(wherein β is a constant defining the slope during initial replenishment and A is a further constant defining the maximum pixel value). The analyzer 725 then generates the parametric image PI by associating a perfusion value (the flow) given by the product A·β to each pixel.

Figure 8A:
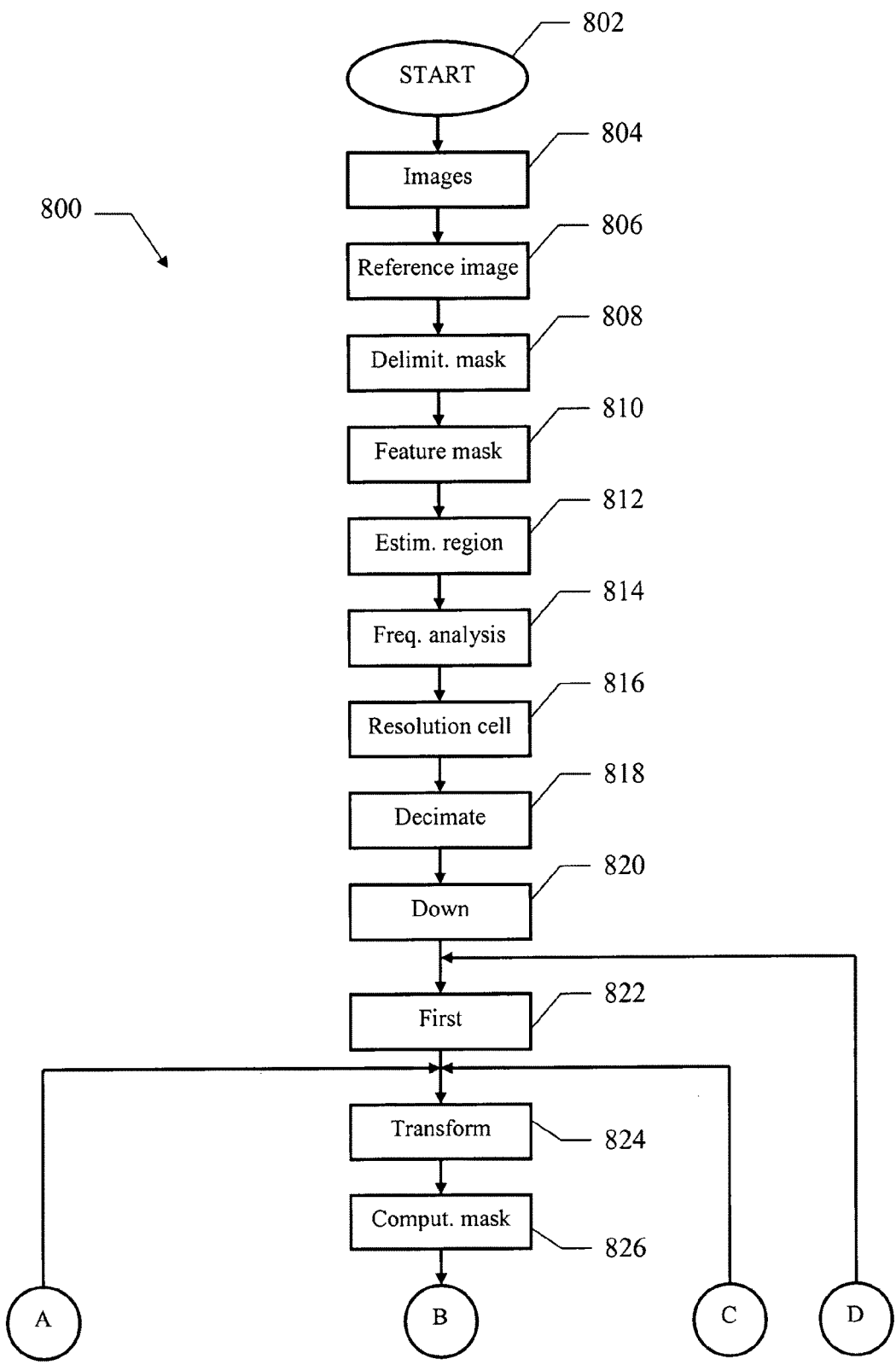
FIGS. 8a-8c show a flow chart describing an illustrative implementation of the solution according to an embodiment of the invention.
Figure 8B:
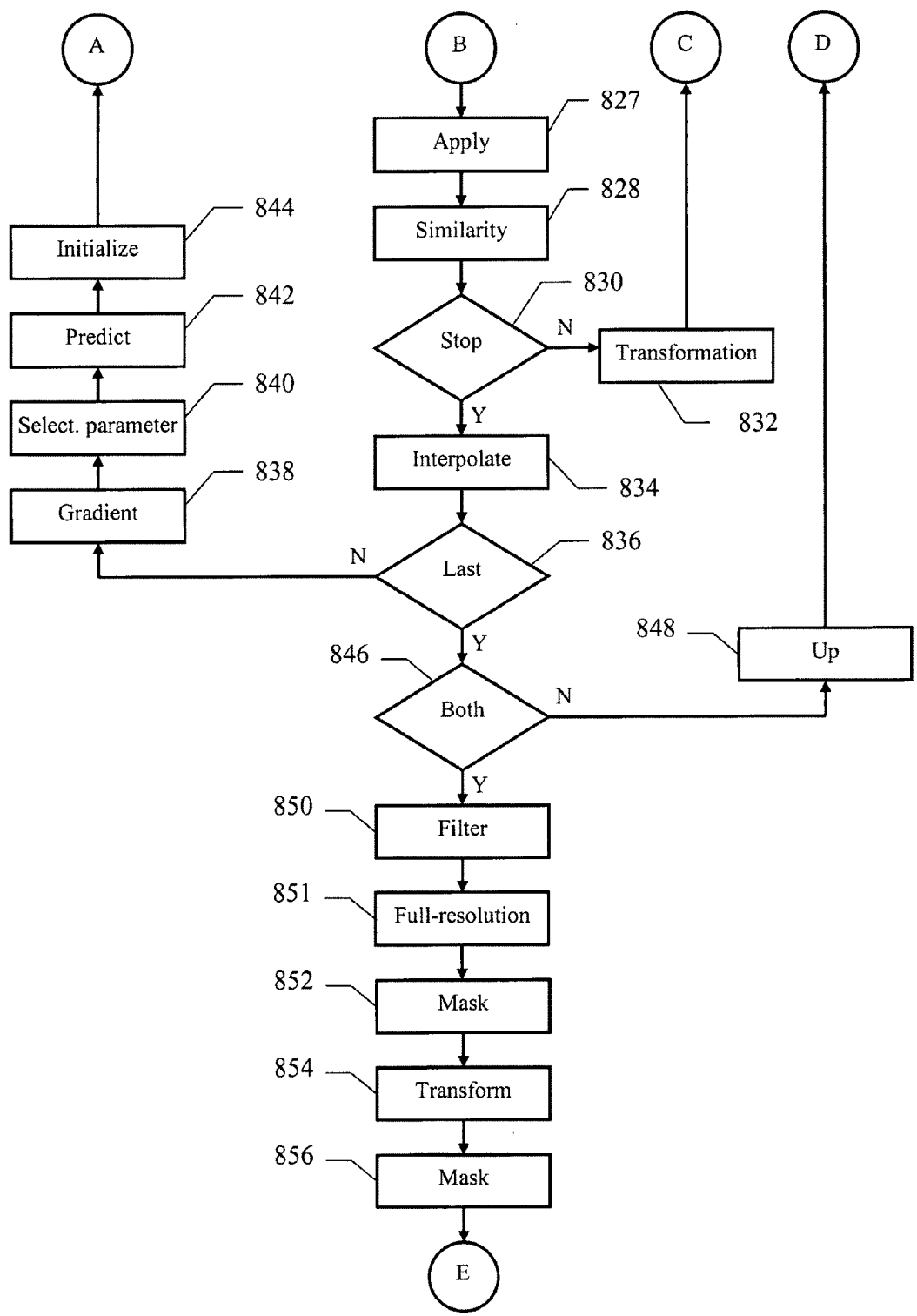
Figure 8C:
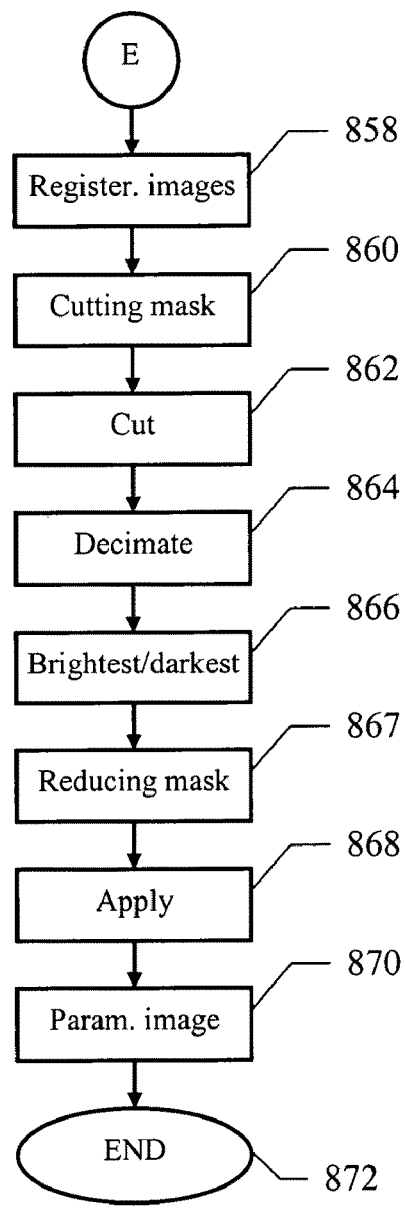

As shown in FIGS. 8a-8c, an embodiment of the present invention implements a method 800 that begins at the start block 802. Passing to block 804, a sequence of images of a body-part of a patient undergoing a perfusion process is acquired.

A registration procedure is then applied to the images of the sequence; typically, this procedure is performed off-line (for example, at the end of the examination). Particularly, the registration procedure begins at block 806, wherein the operator selects the reference image (for re-aligning the other moving images). Continuing to block 808, the operator is required to define the delimitation mask on the reference image. For this purpose, the operator can chose a desired shape from a pull-down menu. Preferably, the delimitation mask consists of a polygon; the proposed shape is particularly advantageous, since it provides a high degree of flexibility with a very simple structure. In this case, the operator selects a series of points on the reference image (clicking on them with the mouse); the selection of the points is terminated by typing the ESC key. The curve defined by joining the points according to their selection order (with the curve that is closed moving from the last point to the first one) defines a polygon, which is displayed on the monitor. The delimitation mask is then built by assigning the logic value 1 to the bits inside the polygon and the logic value 0 to the bits outside the polygon. The same operations described above can be repeated to add one or more further polygons to the delimitation mask (if desired). Likewise, the operator at block 810 defines the feature mask (consisting of one or more polygons) on the reference image.

Passing to block 812, the estimation region is extracted from the reference image. The method continues to block 814, wherein the size of the spatial resolution cell is calculated according to the spatial frequency analysis of the estimation region. The images and the (delimitation and feature) masks are then decimated (i.e., low-pass filtered and re-sampled according to the spatial resolution cell) at block 818.

A loop is now executed once for each sub-sequence defined by the reference image in the sequence, in order to calculate the transformations to be applied to the moving images (for re-aligning them with respect to the reference image). A first iteration of the loop (block 820) is applied to the moving images in a decreasing order from the reference image to the first image. The loop starts at block 822, wherein the moving image directly adjacent to the reference image is selected (with the proposed transformation that is initialized to a null value). Continuing to block 824, the proposed transformation is applied to the current moving image and to the delimitation mask. The computation mask is now determined at block 826. The method passes to block 827, wherein the computation mask is applied to the moving image and to the reference image, so as to obtain the computation-limited floating image and the computation-limited reference image, respectively. Proceeding to block 828, the similarity measure (indicative of the alignment of the two images) is calculated. If the change in the similarity measure is higher than the desired threshold value and the number of iterations is below the maximum acceptable value (decision block 830), the method passes to block 832. The proposed transformation is updated accordingly, and the method then returns to block 824 to reiterate the algorithm.

Conversely, when the change falls below the threshold value (or after the maximum allowable number of iterations) the flow of activity descends into block 834. In this phase, the proposed transformation so obtained is finalized for the current moving image; moreover, the transformations for the skipped moving images (if any) are calculated by interpolation. The method now verifies at block 836 whether the last moving image of the sub-sequence has been processed. If not, the flow of activity continues to block 838 wherein the steepest gradient for the components of the transformation (for the current moving image) is identified. The selection parameter for the next moving image to be processed is determined at block 840 (according to the steepest gradient so identified), so as to skip the desired moving images (if appropriate). Continuing to block 842, the predicted transformation for the next moving image is estimated from the last two available transformations. The predicted transformation is used at block 844 to initialize the optimization algorithm for the next moving image; the method then returns to block 824 to process the next moving image.

Once all the moving images of the sub-sequence have been processed (block 836), the flow of activity descends into block 846; a test is now made to determine whether both the sub-sequences have been analyzed. If not, the above-described loop is re-iterated (block 848) for the moving images in an increasing order from the reference image to the last image. The method then returns to block 822 to start the loop again.

Referring back to block 846, if all the moving images have been processed the flow of activity passes to block 850; in this phase, the sequence of transformations so obtained is low-pass filtered. The process then continues to block 851, wherein the sequence of (full-resolution) transformations is obtained from the sequence of filtered transformations (multiplying each translation component by the corresponding sub-sampling factor of the resolution cell).

With reference now to block 852, the delimitation mask is applied to the moving images. Proceeding to block 854, each resulting delimited image is moved according to the corresponding transformation. The delimitation mask is applied again to the transformed images at block 856. Considering now block 858, the registered images are completed (by adding the corresponding portions of the original images outside the delimitation mask) and stored. At the same time, the cutting mask is determined at block 860.

A flow quantification procedure is then applied to the sequence of registered images. The procedure begins at block 862, wherein the cutting mask is applied to the registered images. The cut images are then decimated (according to the spatial resolution cell) at block 864. Proceeding to block 866, the reducer identifies the brightest image and the darkest image in the sequence. The reducing mask is calculated at block 867 from those images. The cut images are then reduced at block 868 by applying the mask so obtained. Considering now block 870, for each valid pixel in all the reduced images (having a value different from 0) the desired quantitative parameters of the perfusion process are calculated; the resulting parametric image is stored into the corresponding repository. The method then ends at the final block 872.

The above-described algorithm can be explained more intuitively by considering the feature mask as a see-through window. This window shows features of the reference images, which have to be searched on each moving image to be re-aligned. For this purpose, the method shifts the moving image continually under the window, and then verifies whether the desired features have been found. At each attempt, if a region of the moving image that is not of interest (i.e., outside the delimitation mask) enters the window, the corresponding portion of the window is obscured. The regions observed through the non-obscured portion of the window in the reference image and in the shifted moving image are then compared. Once a match is found (with the desired level of accuracy), the moving image so obtained will be automatically re-aligned with the reference image.

Of course, the same result can also be achieved by shifting the window on the moving image (searching for the desired features). In this case as well, if the window reaches a region of the moving image that is not of interest, the corresponding portion of the window is obscured. However, in order to identify the features that had been selected on the reference image for the comparison, it is now necessary to move the reference image with the window or to bring the window back to its original position on the reference image. Moreover, once the match is found the moving image must be shifted in the opposite direction (with respect to the shift of the window) for correctly re-aligning it to the reference image.

More formally (disregarding the sub-sampling operations for the sake of simplicity), in a different implementation of the proposed algorithm, every proposed transformation is applied to the feature mask. The computation mask is now determined as the intersection between the transformed feature mask and the (original) delimitation mask. The computation mask is applied to the moving image (so as to obtain the computation-limited floating image). The computation-limited reference image is instead obtained by applying the proposed transformation to the reference image, and then applying the computation mask on the resulting transformed reference image; alternatively, the reverse of the proposed transformation is applied to the computation mask, and the resulting transformed computation mask is then applied on the (original) reference image. The reverse of the proposed transformation is obtained by inverting the sign of each of its components (i.e., X, Y and θ). In any case, the similarity measure between the computation-limited floating image and the computation-limited reference image is calculated. The same operations are repeated until the change in the similarity measure falls below the threshold value (or after the maximum allowable number of iterations). However, the final transformation for the moving image is now set to the reverse of the proposed transformation so obtained. The method then continues as in the preceding case.

Figure 9:
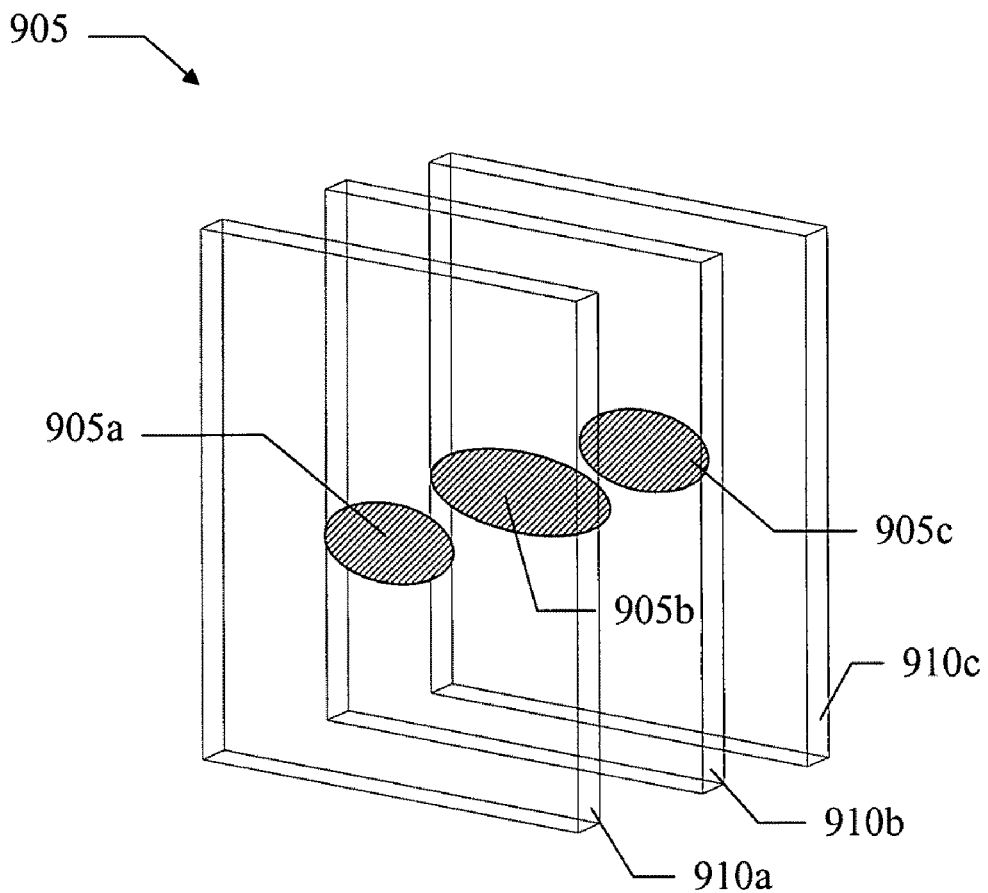
FIG. 9 depicts an application in three-dimensions of the solution according to an embodiment of the invention.

The above-described solution can also be extended to three-dimension (3D) images. In order to ease the representation and discussion of this geometry, as shown in FIG. 9, the body part may be considered (at each moment) as a 3D image volume 905 consisting of a series of frames 905a-905c (three in the example at issue). The frames define corresponding slices that segment the body-part along parallel planes 910a-910c; typically, each slice has a thickness equal to a single voxel. The registration algorithm is similar to the one described above. Particularly, the operator defines a 3D delimitation mask and a 3D feature mask on the reference image. For example, each mask consists of an ellipsoid that is determined by drawing an ellipse on a central frame of the reference image, and then enlarging the figure in 3D by choosing its depth. Moreover, the transformation for each moving image is defined by six components (three translations along the x-axis, y-axis, z-axis and three rotations for the pitch, roll, yaw). The optimization loop then works on multiple frames of each image. In this way, the moving images are re-aligned with a true 3D approach, as provided by a global optimization of the mutual information.

The above-described solution efficiently compensates the motion of the body-part under analysis, thereby substantially removing any artifact due to the misalignment of the images. This strongly improves the accuracy of the medical imaging; for example, the solution of the invention provides a substantial increase of the signal to noise ratio (SNR). The proposed solution significantly increments the quality of the results of the analysis (both in terms of accuracy and spatial resolution). The dynamic definition of the computation mask for each moving image efficiently controls a boundary effect, thereby avoiding any degradation of the results caused by information outside the delimitation mask. It should be noted that the above-mentioned advantages are obtained with a realistic computation complexity, which allows applying the proposed solution at a reasonable speed in most practical situations. All of the above fosters the clinical application of the perfusion assessment in ultrasound imaging.

Figure 10A:
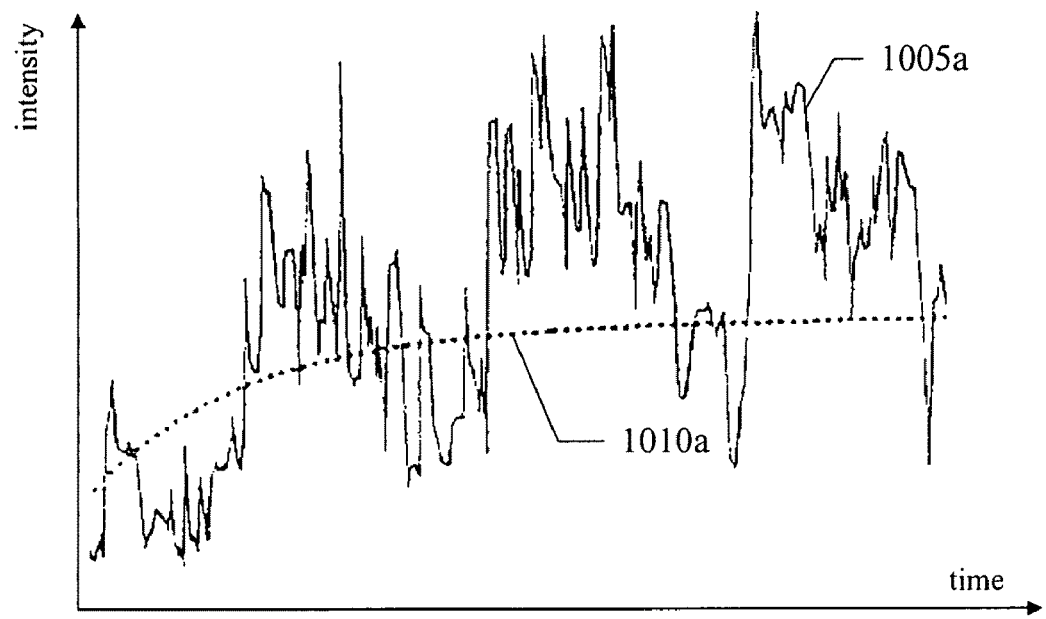
FIGS. 10a and 10b show an example of perfusion curves without registration of the images and with the registration according to an embodiment of the invention, respectively.
Figure 10B:
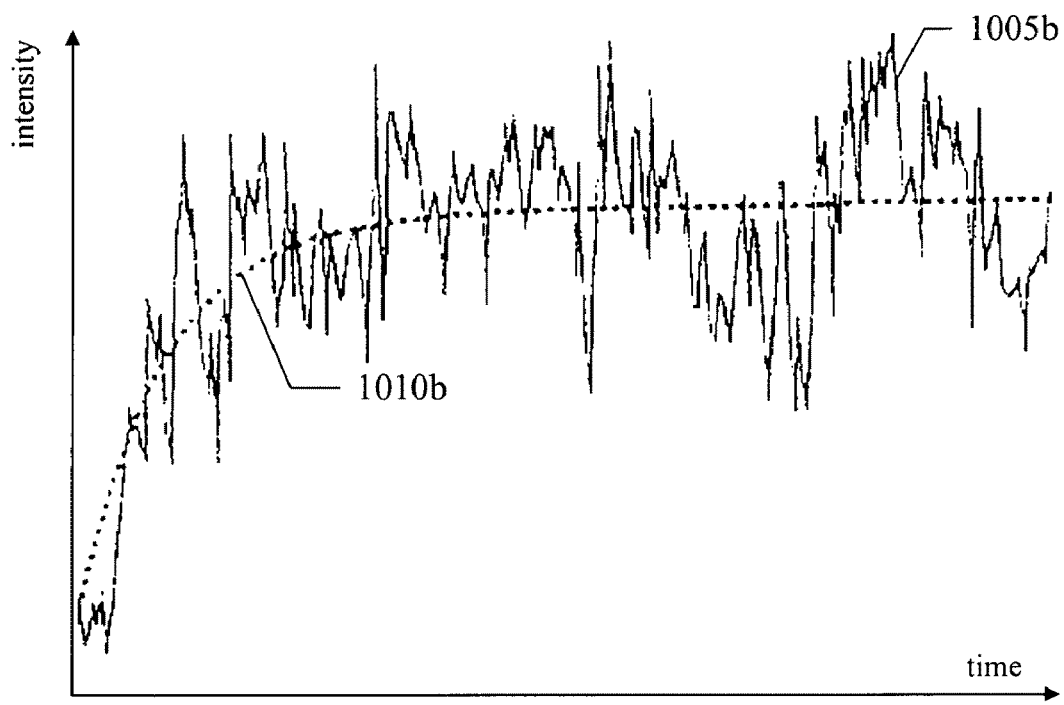

An illustration of the above-mentioned advantages is provided in FIGS. 10a-10b. Considering in particular FIG. 10a, an exemplary sequence of kidney images without any registration generates a perfusion curve 1005a that is fitted, for example, to a mono-exponential model 1010a. As can be seen, the perfusion curve 1005a substantially differs from the corresponding model 1010a. Conversely, FIG. 10b shows a perfusion curve 1005b and a respective mono-exponential model 1010b for the same sequence of images after applying the above-described registration procedure. It is evident that now the perfusion curve 1005b far better matches the corresponding model 1010b. More specifically, the perfusion curve 1005b exhibits a substantially reduced mean standard error between the data and the model, compared to the perfusion curve 1005a of FIG. 10a. Quantitative measurements show that the improvement in accuracy that can be obtained is higher than 20% in most practical situations, and typically higher than 30%.

Modifications

Naturally, in order to satisfy local and specific requirements, a person skilled in the art may apply to the solution described above many modifications and alterations. Particularly, although the present invention has been described with a certain degree of particularity with reference to embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the scanner has a different structure or includes other units (such as a printer); likewise, the images may be taken with a different resolution or may be stored in a different format.

Alternatively, each mask may have a different shape (for example, a square, an ellipse or any arbitrary shape), or it may consist of a single closed curve. In any case, it is possible to define either the delimitation mask or the feature mask in another way (for example, through the coordinates of their borders); moreover, the possibility to obtain both masks by means of an automatic image analysis algorithm is not excluded. For instance, the delineation of the delimitation and/or feature masks can be performed by means of known automatic border detection methods. Alternatively, the feature mask can been delineated as a fixed percentage of the delimitation mask (for example, determined by a margin along the inner border of the delimitation mask); preferably, such percentage accounts for an area comprised between 50% and 100%, more preferably between 50% and 80%, and even more preferably between 55% and 65% of the area of the delimitation mask. Said delineation can be performed, for instance, with the aid of morphological image processing operators, such as erosion.

Moreover, it is not strictly necessary to compare each moving image with the reference image directly during the registration process; for example, the same result may also be achieved indirectly by comparing each moving image with the adjacent moving image already re-aligned. The proposed solution is also suitable to be implemented with optimization algorithms of different categories (for example, based on selected landmarks).

Similar considerations apply if the registration processor has another architecture. For example, it is possible to collapse the motion estimator and the registered image sequencer into a single module (which determines and applies each transformation on the corresponding moving image directly).

In addition, different techniques may be used for applying the transformations. Particularly, the operation of transforming every element (such as a mask, an image, or a portion thereof) has been described above as an actual change of the pixel values of the element according to the desired transformation. However, it should be readily apparent that this is equivalent to transform a coordinate system of the element (by a translation of its origin and/or a rotation around said origin); in this case, the pixel values of the element are not changed, but they are referenced to the transformed coordinate system.

Although in the preceding description reference has been made to a specific optimization algorithm, this is not to be intended as a limitation; for example, the same result may also be achieved by stopping the optimization procedure when the similarity measure itself (instead of its change) reaches a threshold value, or by applying any equivalent computation technique (even involving no iterative process).

Moreover, nothing prevents applying the proposed solution only to a subset of the moving images in the sequence (down to a single one).

In any case, the solution of the invention lends itself to be implemented with the feature mask that is not defined inside the delimitation mask.

In some specific situations it is also preferred to use a feature mask that is substantially smaller than the delimitation mask.

Alternatively, the normalized mutual information may be defined by different formulas, such as:

$$NMI(A,B)=2MI(A,B)/[H(A)+H(B)],$$

$$NMI(A,B)=H(A,B)-MI(A,B), \text{ or}$$

$$NMI(A,B)=[H(A)+H(B)]/H(A,B).$$

In any case, the use of the mutual information without any normalization is not excluded. The mutual information may also be calculated using three distinct histograms, or the transformation that maximizes the mutual information can be determined with different algorithms (such as the Powell or the Simplex methods). However, it should also be noted that the use of other similarity measures (such as the sum of square differences) is not excluded, even if it is far less advantageous.

Similar considerations apply if the spatial sub-sampler has another structure or implements an equivalent algorithm. For example, the sub-sampling factors can have fractional values (with the decimator that uses interpolation techniques during the sub-sampling operation), or can be calculated in the whole region corresponding to the rectified delimitation mask; alternatively, the size of the spatial resolution cell is determined with another technique (such as a wavelet analysis). Moreover, the decimator is suitable to be implemented with different filters, or even without any filtering of the limited reference image. Alternatively, the images are sub-sampled according to other criteria (for example, using predefined sub-sampling factors). In any case, the implementation of the method of the invention without any spatial sub-sampling is not excluded.

In different embodiments of the invention, the optimizer is initialized in another way; for example, in more sophisticated implementations the predicted transformation is estimated using other algorithms (such as based on a linear predictive filter). In any case, its initialization to a null value at each iteration is feasible.

Alternatively, it is possible to initialize the optimizer directly to the transformation for the previous moving image (without any estimation process).

Other embodiments of the invention include the skipping of a number of moving images that is defined statically; in any case, an implementation involving the calculation of the transformations for all the moving images is contemplated.

Moreover, the selection of the reference image at the beginning or at the end of the sequence is viable in some applications.

The proposed solution is also suitable to be implemented by applying the transformations to the entire moving images (and not only to the regions identified by the delimitation mask). Alternatively, it is possible to avoid adding the portion of each original image outside the delimitation mask to the corresponding registered image, or to use non-rigid transformations (for example, affine transformations or deformations based on B-splines).

Alternatively, all the pixels of the moving images can be preserved during the registration process.

In addition, the solution of the invention can also be put into practice without any cutting mask.

Alternatively, the brightest image and the darkest image are determined in a different way (for example, without calculating the average brightness of the images); in any case, the same concepts apply if the reducer determines a most intense image and a least intense image according to other criteria. In some applications (for example, when the contrast agent is administered as a continuous flow), it is possible to determine the reducing mask according to the difference between the pixel values in the first image and in the last image of the sequence, or in two generic images selected by the operator. However, the analysis of the whole registered images (without applying any reducing mask) is contemplated.

In another embodiment of the invention, each 3D image is formed by a different number of frames, or the corresponding slices are defined in another way; moreover, it is possible to use 3D masks having a different shape. Alternatively, the definition of the computation region in a single frame of the images even in the 3D implementation is not excluded.

Likewise, the flow quantification module may have another structure or it may include equivalent units. In addition, it is possible to calculate different parameters, a common perfusion value (by sorting and grouping the values of the parametric image), or even evaluate the perfusion without generating any parametric image. Similar considerations apply if an equivalent contrast agent is administered; however, the exploitation of the proposed solution in other medical imaging applications (for example, a simple echography without the administration of any contrast agent) is contemplated.

The same concepts can also be applied to scanners based on other techniques, for example, X-ray Computed Topography (CT), Magnetic Resonance Imaging (MRI) or Positron Emission Tomography (PET).

Similar considerations apply if the program (which may be used to implement the invention) is structured in a different way, or if additional modules or functions are provided. Moreover, the proposed solution lends itself to be implemented with an equivalent method (for example, with similar or additional steps). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to one or more embodiments of the present invention lends itself to be carried out with a hardware structure (for example, integrated in a chip of semiconductor material), or with a combination of software and hardware.

Alternatively, the medical imaging system consists of a scanner and a distinct computer (or any equivalent image registration apparatus); in this case, recorded data is transferred from the scanner to the computer for its processing (for example, through floppy-disks, a memory pen, or a network connection).

From the foregoing it will be appreciated that, although specific embodiments of the invention have been described herein for purposes of illustration, various modifications may be made without deviating from the spirit and scope of the invention.

The invention claimed is:

1. An image registration method for use in medical imaging, the method including the steps of:
providing a sequence of images each one including a digital representation of a body-part under analysis,
selecting a reference image within the sequence, the remaining images of the sequence defining moving images, and
re-aligning at least one portion of a moving image with respect to the reference image,
wherein the step of re-aligning includes:
a) defining a delimitation mask identifying a region on the reference image with which the at least one portion of the moving image has to be re-aligned, and a feature mask identifying a further region on the reference image within which the re-alignment is calculated,
b) determining an optimized transformation for compensating a displacement of the moving image with respect to the reference image by optimizing a similarity measure between:
b1) a first computation region identified on the reference image by a computation mask and a second computation region identified by the computation mask on the moving image transformed according to a proposed transformation, the computation mask being determined by the intersection between the delimitation mask transformed according to the proposed transformation and the feature mask, or
b2) a first computation region identified by a computation mask on the reference image transformed according to a proposed transformation and a second computation region identified by the computation mask on the moving image, the computation mask being determined by the intersection between the feature mask transformed according to the proposed transformation and the delimitation mask, or b3) a first computation region identified on the reference image by a computation mask transformed according to the reverse of a proposed transformation and a second computation region identified by the computation mask on the moving image, the computation mask being determined by the intersection between the feature mask transformed according to the proposed transformation and the delimitation mask, and c) transforming the at least one portion of the moving image according to the optimized transformation.

2. The method according to claim 1, wherein the step c) of transforming includes:
c1) applying the optimized transformation to the at least one portion of the moving image when the optimized transformation is determined according to step b1), or
c2) applying the reverse of the optimized transformation to the at least one portion of the moving image when the optimized transformation is determined according to steps b2) or b3).

3. The method according to claim 1, wherein the step of determining the optimized transformation includes the iteration of calculating the similarity measure corresponding to the proposed transformation until the similarity measure or a change thereof reaches a threshold value.

4. The method according to claim 1, further including the iteration of the step of re-aligning for each further moving image of the sequence.

5. The method according to claim 1, wherein the feature mask is defined inside the delimitation mask.

6. The method according to claim 1, wherein the feature mask has a size larger than 50% of a size of the delimitation mask.

7. The method according to claim 1, wherein the similarity measure is a mutual information measure.

8. The method according to claim 1, further including the steps of:
estimating a spatial resolution along each dimension of the reference image,
calculating a sub-sampling factor for each dimension according to the spatial resolution, and
sub-sampling at least part of each image according to the sub-sampling factors.

9. The method according to claim 8, wherein the step of estimating the spatial resolution includes:
determining an estimation region on the reference image having a rectangular shape and being included in the smallest rectangle surrounding the feature mask, the spatial resolution being estimated in the estimation region.

10. An image registration method for use in medical imaging, the method comprising the steps of:
providing a sequence of images each one including a digital representation of a body-part under analysis,
selecting a reference image within the sequence, the remaining images of the sequence defining moving images, and
re-aligning at least one portion of a moving image with respect to the reference image,
wherein the step of re-aligning includes:
a) defining a delimitation mask identifying a region on the reference image with which the at least one portion of the moving image has to be re-aligned, and a feature mask identifying a further region on the reference image within which the re-alignment is calculated, b) determining an optimized transformation for compensating a displacement of the moving image with respect to the reference image by optimizing a similarity measure between:
b1) a first computation region identified on the reference image by a computation mask and a second computation region identified by the computation mask on the moving image transformed according to a proposed transformation, the computation mask being determined by the intersection between the delimitation mask transformed according to the proposed transformation and the feature mask, or
b2) a first computation region identified by a computation mask on the reference image transformed according to a proposed transformation and a second computation region identified by the computation mask on the moving image, the computation mask being determined by the intersection between the feature mask transformed according to the proposed transformation and the delimitation mask, or
b3) a first computation region identified on the reference image by a computation mask transformed according to the reverse of a proposed transformation and a second computation region identified by the computation mask on the moving image, the computation mask being determined by the intersection between the feature mask transformed according to the proposed transformation and the delimitation mask, and c) transforming the at least one portion of the moving image according to the optimized transformation; and further including the iteration of the step of re-aligning for each further moving image of the sequence;

wherein the sequence includes at least one sub-sequence each one ordered from the reference image to a corresponding boundary image of the sequence, the step of determining the optimized transformation further including, for each next moving image being not adjacent to the reference image:

initializing the proposed transformation for the next moving image according to the optimized transformation for at least one previous moving image in the corresponding sub-sequence.

11. The method according to claim 10, wherein the at least one previous moving image consists of a plurality of previous moving images, the step of initializing the proposed transformation for the next moving image including:
estimating the proposed transformation for the next moving image through a predictive algorithm based on the optimized transformations for the previous moving images.

12. The method according to claim 10, further including the steps of:
skipping a number of moving images following a current moving image in the corresponding sub-sequence for defining the next moving image, said number being determined according to a gradient of the optimized transformation for the current moving image, and
interpolating the optimized transformation for each skipped moving image between the optimized transformation for the current moving image and the optimized transformation for the next moving image.

13. The method according to claim 10, wherein the reference image differs from the boundary images of the sequence, the at least one sub-sequence consisting of a sub-sequence ordered from the reference image to a first image of the sequence and a further sub-sequence ordered from the reference image to a last image of the sequence.

14. The method according to claim 1, wherein each transformation is a rigid transformation.

15. The method according to claim 1, wherein each image includes a plurality of visualizing elements each one representing a corresponding basic area of the body-part, for each moving image the method further including the step of:
- discarding each visualizing element of the moving image or of the moving image transformed according to the optimized transformation being outside the delimitation mask.

16. The method according to claim 15, further including the steps of:
- reducing each image by discarding each visualizing element being discarded in at least one of the moving images, and
- determining a result of the analysis according to the reduced images.

17. The method according to claim 16, further including the steps of:
- identifying a most intense image and a least intense image in the sequence,
- for each basic area calculating a difference between the corresponding visualizing element in the most intense image and the corresponding visualizing element in the least intense image, and
- discarding the visualizing elements for the basic area in all the images if the corresponding difference is lower than a threshold value.

18. The method according to claim 1, wherein each image includes a plurality of frames each one being representative of a corresponding slice of the body-part, the delimitation mask and the feature mask being defined on at least two of the frames of the reference image.

19. The method according to claim 1, wherein each image is representative of an ultrasound response of the body-part.

20. The method according to claim 1, wherein the analysis consists of the assessment of a perfusion of a contrast agent in the body-part.

21. A non-transitory computer readable medium carrying a computer program for performing the method of claim 1 when the computer program is executed on a data processing system.

22. A computer program product including a non-transitory computer-usable medium carrying a computer program, the computer program when executed on a data processing system causing the system to perform the method according to claim 1.

23. An image registration apparatus including means for performing the steps of the method according to claim 1.

24. A medical imaging system including the registration apparatus according to claim 23 and means for acquiring the sequence of images.

* * * * *